United States Patent
Morishige et al.

(10) Patent No.: US 9,239,081 B2
(45) Date of Patent: Jan. 19, 2016

(54) SYNTHETIC RESIN-MADE SLIDING BEARING

(71) Applicant: OILES CORPORATION, Tokyo (JP)

(72) Inventors: Kouichi Morishige, Fujisawa (JP); Takashi Horiguchi, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 14/349,446

(22) PCT Filed: Oct. 2, 2012

(86) PCT No.: PCT/JP2012/006313
§ 371 (c)(1),
(2) Date: Apr. 3, 2014

(87) PCT Pub. No.: WO2013/051240
PCT Pub. Date: Apr. 11, 2013

(65) Prior Publication Data
US 2014/0248009 A1  Sep. 4, 2014

(30) Foreign Application Priority Data

Oct. 7, 2011  (JP) .................. 2011-223476

(51) Int. Cl.
*F16C 33/74*  (2006.01)
*F16C 17/10*  (2006.01)
(Continued)

(52) U.S. Cl.
CPC .................. *F16C 33/74* (2013.01); *F16C 17/10* (2013.01); *F16C 33/1065* (2013.01);
(Continued)

(58) Field of Classification Search
CPC ........ F16C 17/04; F16C 33/74; F16C 33/743; F16C 2208/00

USPC ................ 384/130, 138–140, 143, 147, 368, 384/420–427
See application file for complete search history.

(56) References Cited

U.S. PATENT DOCUMENTS 6,918,701 B2 *  7/2005  Ueno et al. .................... 384/420
8,016,489 B2 *  9/2011  Kaneko et al. ................ 384/147
(Continued)

FOREIGN PATENT DOCUMENTS

EP   2128464 A1 * 12/2009 ............. B60G 15/06
EP   2 719 910      4/2014
(Continued)

OTHER PUBLICATIONS

International Search Report for PCT/JP2012/006313, mailed Dec. 25, 2012.
(Continued)

*Primary Examiner* — Marcus Charles
(74) *Attorney, Agent, or Firm* — Nixon & Vanderhye, P.C.

(57) ABSTRACT

A sliding bearing 1 includes: a synthetic resin-made upper casing 2 which is fixed to a vehicle body side via a mounting member; a synthetic resin-made lower casing 3 which is superposed on the upper casing 2 and on which a spring bearing surface for a suspension coil spring is formed; a synthetic resin-made sliding bearing piece 5 disposed in an annular space 4 between the upper casing 2 and the lower casing 3; and an annular inner seal member 8 and an annular outer seal member 9, both made of a synthetic resin, for respectively sealing an annular gap 6 on an inner peripheral side in a radial direction X and an annular gap 7 on an outer peripheral side in the radial direction X between the upper casing 2 and the lower casing 3, the annular gap 6 and the annular gap 7 allowing the annular space 4 to communicate with the outside.

9 Claims, 18 Drawing Sheets

(51) Int. Cl.
*F16C 33/20* (2006.01)
*F16C 33/10* (2006.01)

(52) U.S. Cl.
CPC .......... *F16C 33/201* (2013.01); *F16C 2208/00* (2013.01); *F16C 2208/04* (2013.01); *F16C 2220/04* (2013.01); *F16C 2326/05* (2013.01); *F16C 2361/53* (2013.01)

(56) References Cited

U.S. PATENT DOCUMENTS

| | | | |
|---|---|---|---|
| 2009/0180719 A1* | 7/2009 | Miyata et al. | 384/147 |
| 2009/0220179 A1 | 9/2009 | Kaneko et al. | |
| 2010/0104228 A1* | 4/2010 | Kaneko | 384/420 |
| 2010/0202716 A1* | 8/2010 | Kaneko | 384/368 |
| 2011/0135228 A1* | 6/2011 | Kaneko et al. | 384/420 |
| 2014/0112605 A1 | 4/2014 | Morishige et al. | |

FOREIGN PATENT DOCUMENTS

| | | | |
|---|---|---|---|
| JP | 2001-27227 | 1/2001 | |
| JP | 2001-27227 A | 1/2001 | |
| JP | 2001-027228 | 1/2001 | |
| JP | 2001-027229 | 1/2001 | |
| JP | 2009250278 A * | 10/2009 | |
| JP | 2012036983 A * | 2/2012 | |
| WO | WO 2007/132557 | 11/2007 | |
| WO | WO 2007/132557 A1 | 11/2007 | |
| WO | WO 2009128252 A1 * | 10/2009 | ............. F16C 33/20 |
| WO | WO 2012/017591 | 2/2012 | |
| WO | WO 2012/017591 A1 | 2/2012 | |
| WO | WO 2012/114679 | 8/2012 | |
| WO | WO 2012/114679 A1 | 8/2012 | |

OTHER PUBLICATIONS

European Office Action issued in Application No. 12 839 098.6 dated Oct. 12, 2015.

* cited by examiner

SYNTHETIC RESIN-MADE SLIDING BEARING

This application is the U.S. national phase of International Application No. PCT/JP2012/006313 filed 2 Oct. 2012 which designated the U.S. and claims priority to JP Patent Application No. 2011-223476 filed 7 Oct. 2011, the entire contents of each of which are hereby incorporated by reference.

TECHNICAL FIELD

The present invention relates to a synthetic resin-made sliding bearing which is suitably incorporated as a sliding bearing of a strut-type suspension (Macpherson type) in a four-wheeled motor vehicle.

BACKGROUND ART

In general, a strut-type suspension is mainly used for a front wheel of a four-wheeled motor vehicle, and is so arranged that a strut assembly incorporating a hydraulic shock absorber in an outer cylinder integrated with a main shaft is combined with a suspension coil spring. Among such suspensions, there is a type in which when the strut assembly rotates together with the coil spring in the steering operation, the piston rod of the strut assembly rotates, and a type in which the piston rod does not rotate. In either type, there are cases where, instead of a rolling ball bearing, a synthetic resin-made sliding bearing is used between a mounting member on the vehicle body and an upper spring seat of the coil spring, so as to allow smooth rotation of the strut assembly.

PRIOR ART DOCUMENTS

Patent Documents

[Patent Document 1] JP-A-2001-27227
[Patent Document 2] JP-A-2001-27228
[Patent Document 3] JP-A-2001-27229

Concerning a synthetic resin-made sliding bearing which includes a synthetic resin-made lower casing, a synthetic resin-made upper casing superposed on this lower casing, and a synthetic resin-made sliding bearing means disposed in a space between the upper and lower casings, in Patent Document 1, a synthetic resin-made sliding bearing is proposed which is comprised of an outer resiliently sealing means disposed on an outer peripheral side between the upper and lower casings and an inner resiliently sealing means disposed on an inner peripheral side between the upper and lower casings; in Patent Document 2, a synthetic resin-made sliding bearing is proposed which is comprised of an outer sealing means disposed on an outer peripheral side in the space between the upper and lower casings and an inner labyrinth sealing means disposed on an inner peripheral side in the space between the upper and lower casings; and in Patent Document 3, a synthetic resin-made sliding bearing is proposed which is comprised of a resiliently sealing means which is disposed in such a manner as to cover an outer surface of the lower casing and which seals outer and inner annular openings of a space between the upper and lower casings at both annular end portions.

SUMMARY OF THE INVENTION

Problems that the Invention is to Solve

Incidentally, with the sliding bearing of Patent Document 1, in order to seal respective gaps on the inner and outer peripheral sides between the upper and lower casings, the inner resiliently sealing means and outer resiliently sealing means which are separate members are disposed in the respective gaps, so that time is required in the assembly operation and therefore there is a possibility of causing a rise in the manufacturing cost. With the sliding bearing of Patent Document 2, since the labyrinth sealing means is used to seal the inner gap between the upper and lower casings, the characteristic of preventing the ingress of dust, muddy water, and the like from the gap on the inner peripheral side is slightly inferior in comparison with the resiliently sealing means. With the sliding bearing of Patent Document 3, since the resiliently sealing means for sealing the respective gaps on the inner and outer peripheral sides between the upper and lower casings is disposed on an outer surface of the lower casing, there is a possibility of such as the coming off of the resiliently sealing means from the lower casing when used over extended periods of time. None of these sliding bearings are yet satisfactory in respect of problems of the cost of manufacturing such as assembly as well as durability and sealability in technical terms.

The present invention has been devised in view of the above-described aspects, and its object is to provide a synthetic resin-made sliding bearing which is capable of reliably preventing the ingress of dust and the like onto sliding surfaces and does not cause a decline in the sliding characteristics due to the ingress of the dust and the like, and which makes it possible to reduce the time of assembly operation and does not easily come off due to vibrations and the like, thereby making it possible to reduce the manufacturing cost, improve durability and sealability, and maintain smooth steering during the steering operation over extended periods of time.

Means for Overcoming the Problems

A synthetic resin-made sliding bearing in accordance with the present invention comprises: a synthetic resin-made upper casing integrally including an annular upper casing base portion having an annular lower surface in an axial direction, an inner cylindrical suspended portion suspended from a radially inner peripheral end portion of the annular lower surface of the upper casing base portion, and an outer cylindrical suspended portion suspended from a radially outer peripheral end portion of the annular lower surface of the upper casing base portion; a synthetic resin-made lower casing integrally including an annular lower casing base portion having an annular upper surface in the axial direction and superposed on the upper casing so as to be rotatable about an axis relative to the upper casing, a cylindrical protrusion protruding from the annular upper surface of the lower casing base portion toward the annular lower surface of the upper casing base portion, a plurality of inner inward protrusions which are integrally formed on a cylindrical inner surface of the cylindrical protrusion along a circumferential direction and protrude radially inwardly, and a plurality of outer outward protrusions which are integrally formed on a cylindrical outer surface of the cylindrical protrusion along the circumferential direction and protrude radially outwardly; a synthetic resin-made sliding bearing piece disposed in an annular space between the annular lower surface of the upper casing base portion and the annular upper surface of the cylindrical protrusion and in an annular space between an outer peripheral surface of the inner cylindrical suspended portion and the cylindrical inner surface of the cylindrical protrusion, so as to be brought at an axial annular upper surface and a radial cylindrical inner peripheral surface thereof into slidable contact with the annular lower surface of the upper casing base portion and a radial outer peripheral surface of the inner cylindrical suspended portion, while being brought at an axial annular lower surface and a radial cylindrical outer peripheral surface thereof into contact with an axial annular upper surface and a radial cylindrical inner surface of the cylindrical protrusion; an inner seal member including an annular inner seal base portion which is connected to the cylindrical inner surface of the cylindrical protrusion in such a manner as to cover the plurality of inner inward protrusions of the cylindrical protrusion and a flexible inner seal portion which is connected to an inner peripheral surface of the inner seal base portion and is elastically brought into flexural contact with the outer peripheral surface of the inner cylindrical suspended portion of the upper casing, so as to seal a gap between the outer peripheral surface of the inner cylindrical suspended portion of the upper casing and the inner peripheral surface of the inner seal base portion; and an outer seal member including an annular outer seal base portion which is connected to the cylindrical outer surface of the cylindrical protrusion in such a manner as to cover the plurality of outer outward protrusions of the cylindrical protrusion and a flexible outer seal portion which is connected to an outer peripheral surface of the outer seal base portion and is elastically brought into flexural contact with an inner peripheral surface of the outer cylindrical suspended portion of the upper casing, so as to seal a gap between the inner peripheral surface of the outer cylindrical suspended portion of the upper casing and the outer peripheral surface of the outer seal base portion.

According to the synthetic resin-made sliding bearing in accordance with the present invention, since the annular inner seal base portion of the inner seal member is joined to the cylindrical inner surface of the cylindrical protrusion in such a manner as to cover the plurality of inner inward protrusions of the cylindrical protrusion of the lower casing base portion, and the annular outer seal base portion of the outer seal member is joined to the cylindrical outer surface of the cylindrical protrusion of the lower casing base portion, it is possible to prevent the possibility of the inner seal member and the outer seal member coming off, thereby making it possible to improve durability. In addition, sealability can be further improved since the inner seal portion for sealing the gap between the outer peripheral surface of the inner cylindrical suspended portion of the upper casing and the inner peripheral surface of the inner seal base portion is connected to the inner peripheral surface of the inner seal base portion and is elastically brought into flexural contact with the outer peripheral surface of the inner cylindrical suspended portion of the upper casing, and since the outer seal portion for sealing the gap between the inner peripheral surface of the outer cylindrical suspended portion of the upper casing and the outer peripheral surface of the outer seal base portion is connected to the outer peripheral surface of the outer seal base portion and is elastically brought into flexural contact with the inner peripheral surface of the outer cylindrical suspended portion of the upper casing.

In a preferred embodiment of the synthetic resin-made sliding bearing in accordance with the present invention, the inner seal portion of the inner seal member has a smaller thickness than the thickness of the inner seal base portion and extends diagonally downwardly from the inner peripheral surface of the inner seal base portion, and the outer seal portion of the outer seal member has a smaller thickness than the thickness of the outer seal base portion and extends diagonally downwardly from the outer peripheral surface of the outer seal base portion.

The upper casing may further have an annular seat portion formed integrally on a radially central portion of the annular upper surface in the axial direction of the upper casing base portion.

In one preferred embodiment, the inner cylindrical suspended portion has a thick-walled cylindrical portion connected at its axially upper end portion to a radially inner peripheral end portion of the annular lower surface of the upper casing base portion and a thin-walled cylindrical portion which is connected at its axially upper end portion to an axially lower end of the thick-walled cylindrical portion and is thinner-walled than the thick-walled cylindrical portion; the inner seal portion is elastically brought into flexural contact with a radial cylindrical outer peripheral surface of the thin-walled cylindrical portion of the inner cylindrical suspended portion; and the outer cylindrical suspended portion includes a cross-sectionally trapezoidal cylindrical portion which is connected at its axially upper end portion to a radially outer peripheral end portion of the annular lower surface of the upper casing base portion and has an inner peripheral surface which is gradually enlarged in diameter as viewed in an axial direction away from the annular lower surface of the upper casing base portion, as well as a cylindrical portion which is connected to an axially lower end of the cross-sectionally trapezoidal cylindrical portion, the outer seal portion being elastically brought into flexural contact with the inner peripheral surface of the cross-sectionally trapezoidal cylindrical portion of the outer cylindrical suspended portion.

The lower casing may further include a plurality of curved projecting portions which are provided uprightly on an outer peripheral edge portion of the annular upper surface of the cylindrical protrusion of the lower casing along the outer peripheral edge portion, in which case the sliding bearing piece may include an annular thrust sliding bearing piece portion having an annular upper surface which is brought into slidable contact with the annular lower surface of the upper casing base portion and an annular lower surface which is brought into contact with the annular upper surface of the cylindrical protrusion, a cylindrical radial sliding bearing piece portion which, at its one end portion, is integrally formed on one end portion of the thrust sliding bearing piece portion in such a manner as to extend from the one end portion downwardly in the axial direction and has a cylindrical inner peripheral surface which is brought into slidable contact with the outer peripheral surface of the inner cylindrical suspended portion and a cylindrical outer peripheral surface which is brought into contact with the cylindrical inner surface of the cylindrical protrusion, and a plurality of radial projecting plate piece portions which project radially outwardly from an outer peripheral surface of the thrust sliding bearing piece portion, and which are respectively disposed between adjacent ones of the curved projecting portions of the lower casing so that the sliding bearing piece does not rotate in the circumferential direction with respect to the lower casing.

The thrust sliding bearing piece portion may have an annular groove formed on an inner peripheral side of its annular upper surface and a plurality of radial grooves which are open at their one ends to the annular groove and are open at their other ends to the outer peripheral surface, and which are formed on the upper surface by being spaced apart at equal intervals in the circumferential direction, and the radial sliding bearing piece portion may have a plurality of axial grooves which are open at their both ends and are provided on the cylindrical inner peripheral surface by being spaced apart at equal intervals in the circumferential direction. The annular groove and the plurality of radial grooves serve as a sump section for lubricating oil such as grease.

The thrust sliding bearing piece portion may have pluralities of inner recessed portions and outer recessed portions which are formed in its annular upper surface along the circumferential direction and in at least two rows including an inner row and an outer row in the radial direction, and which are arranged with phase differences with respect to each other in the circumferential direction.

Each of the plurality of inner recessed portions may be defined by an inner circular arc-shaped surface extending in a circular arc shape about the axis as a center; an outer circular arc-shaped surface extending in a circular arc shape about the axis as the center radially outwardly of the inner circular arc-shaped surface; a pair of semicircular surfaces respectively connected to the inner circular arc-shaped surface and the outer circular arc-shaped surface and opposed to each other in the circumferential direction; and a bottom surface connected to respective ones of the inner circular arc-shaped surface, the outer circular arc-shaped surface, and the pair of semicircular surfaces. In addition, each of the plurality of outer recessed portions may be defined by an inner circular arc-shaped surface extending in a circular arc shape about the axis as a center; an outer circular arc-shaped surface extending in a circular arc shape about the axis as the center radially outwardly of the inner circular arc-shaped surface; a pair of semicircular surfaces respectively connected to the inner circular arc-shaped surface and the outer circular arc-shaped surface and opposed to each other in the circumferential direction; and a bottom surface connected to respective ones of the inner circular arc-shaped surface, the outer circular arc-shaped surface, and the pair of semicircular surfaces.

A ratio of a total area of opening surfaces of the pluralities of inner recessed portions and outer recessed portions in surfaces which combine the opening surfaces of the pluralities of inner recessed portions and outer recessed portions and the annular upper surface of the thrust sliding bearing piece portion is 20 to 50%, preferably 30 to 40%.

In these inner recessed portions and outer recessed portions for retaining lubricating oil such as grease, in order to allow the low friction properties of the lubricating oil to be exhibited satisfactorily, it suffices if the ratio of the total area of opening surfaces of the pluralities of inner recessed portions and outer recessed portions in the surfaces which combine the opening surfaces of the pluralities of inner recessed portions and outer recessed portions and the annular upper surface of the thrust sliding bearing piece portion is at least 20%. If this ratio exceeds 50%, the strength of the thrust sliding bearing piece portion is caused to decline, and plastic deformation such as creep is liable to occur.

In a referred embodiment, the inner seal member and the outer seal member are respectively formed on the cylindrical inner surface and the cylindrical outer surface of the cylindrical protrusion of the lower casing base portion by insert molding.

The synthetic resin-made sliding bearing in accordance with the present invention is preferably used as a sliding bearing for a strut-type suspension of a four-wheeled motor vehicle.

The synthetic resin for forming the upper casing may be a thermoplastic synthetic resin such as polyacetal resin, polyamide resin, or polybutylene terephthalate resin. In addition, the synthetic resin for forming the lower casing may be a thermoplastic synthetic resin such as polyacetal resin, polyamide resin, or polybutylene terephthalate resin containing reinforcing fibers including glass fibers, carbon fibers, and the like. The synthetic resin for forming the sliding bearing piece may be a thermoplastic synthetic resin such as polyacetal resin, polyamide resin, polybutylene terephthalate resin, or polyolefin resin such as polyester resin. As the synthetic resin for forming the inner seal member and the outer seal member, it is possible to cite polyurethane resin, a polyester elastomer, or the like as preferred examples.

Advantages of the Invention

According to the present invention, it is possible to provide a synthetic resin-made sliding bearing which is capable of reliably preventing the ingress of dust and the like onto sliding surfaces in an upper casing and a lower casing, and a sliding bearing piece without causing a decline in the sliding characteristics due to the ingress of the dust and the like, and which makes it possible to reduce time in the assembly operation and does not easily come off due to vibrations and the like, thereby making it possible to attain a reduction in the manufacturing cost, improve durability and sealability, and maintain smooth steering during the steering operation over extended periods of time.

MODE FOR CARRYING OUT THE INVENTION

Figure 1:
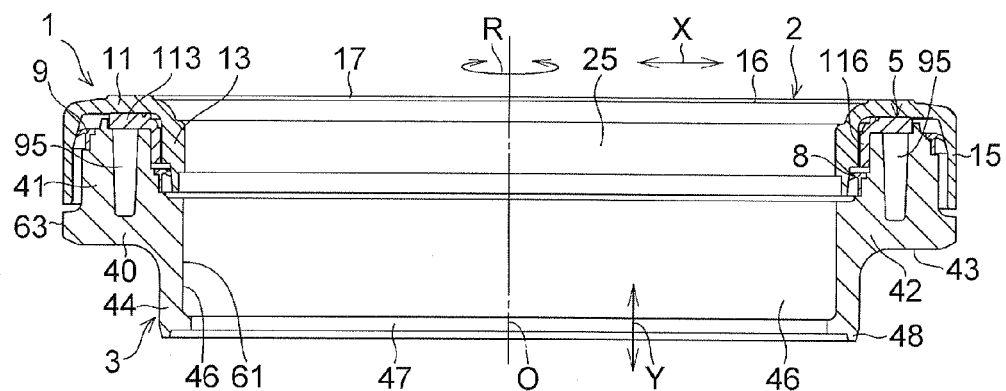
FIG. 1 is an explanatory cross-sectional view, taken in the direction of arrows along line I-I shown in FIG. 3, of a preferred embodiment of the present invention.
Figure 2:
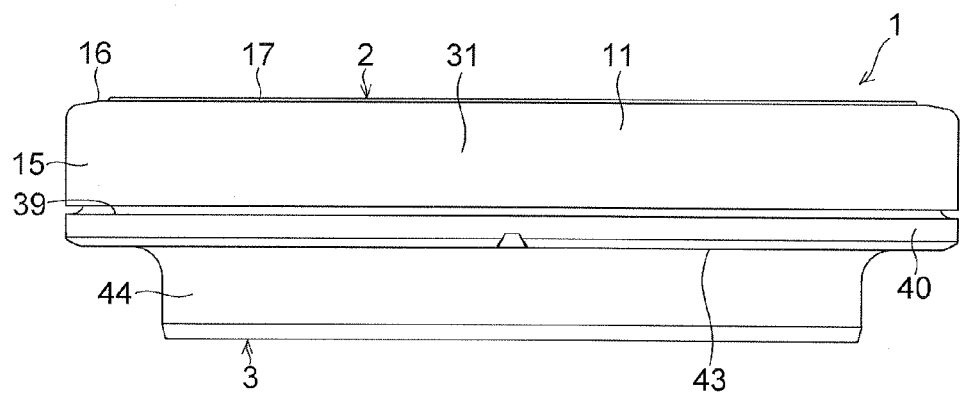
FIG. 2 is an explanatory front elevational view of the embodiment shown in FIG. 1.
Figure 3:
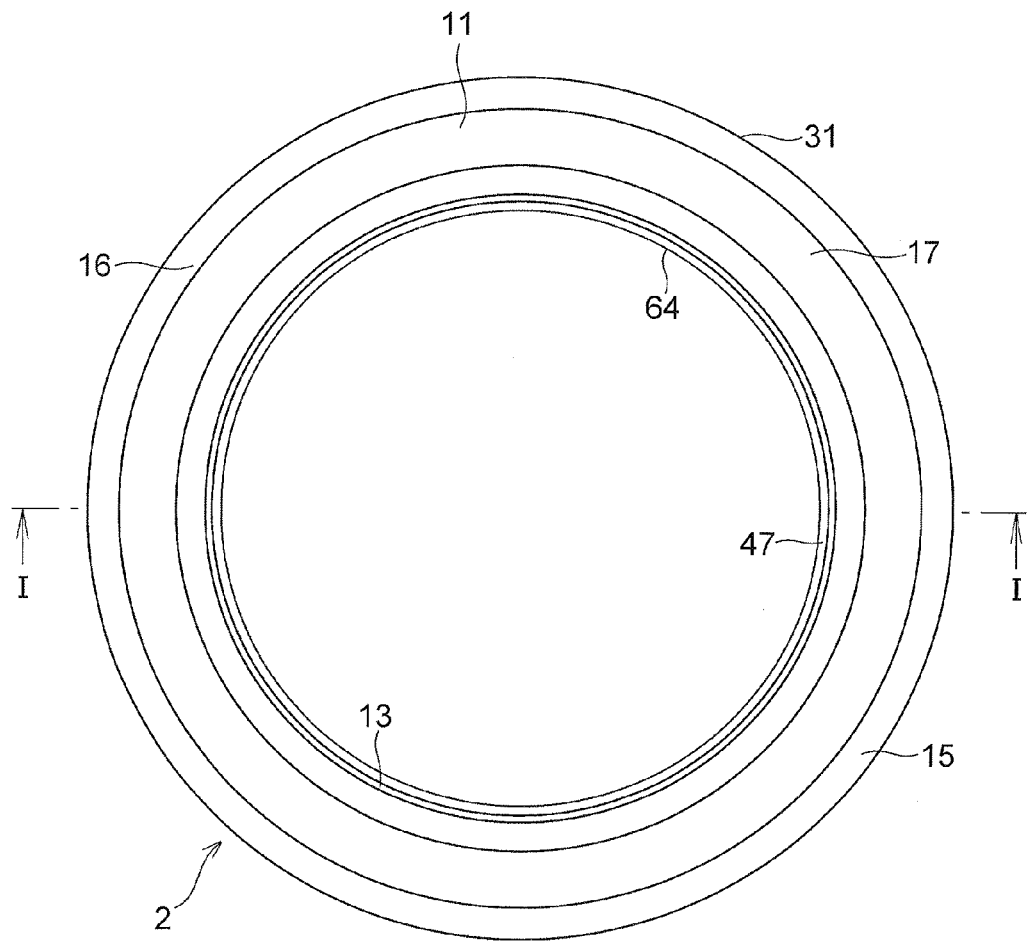
FIG. 3 is an explanatory plan view of the embodiment shown in FIG. 1.
Figure 4:
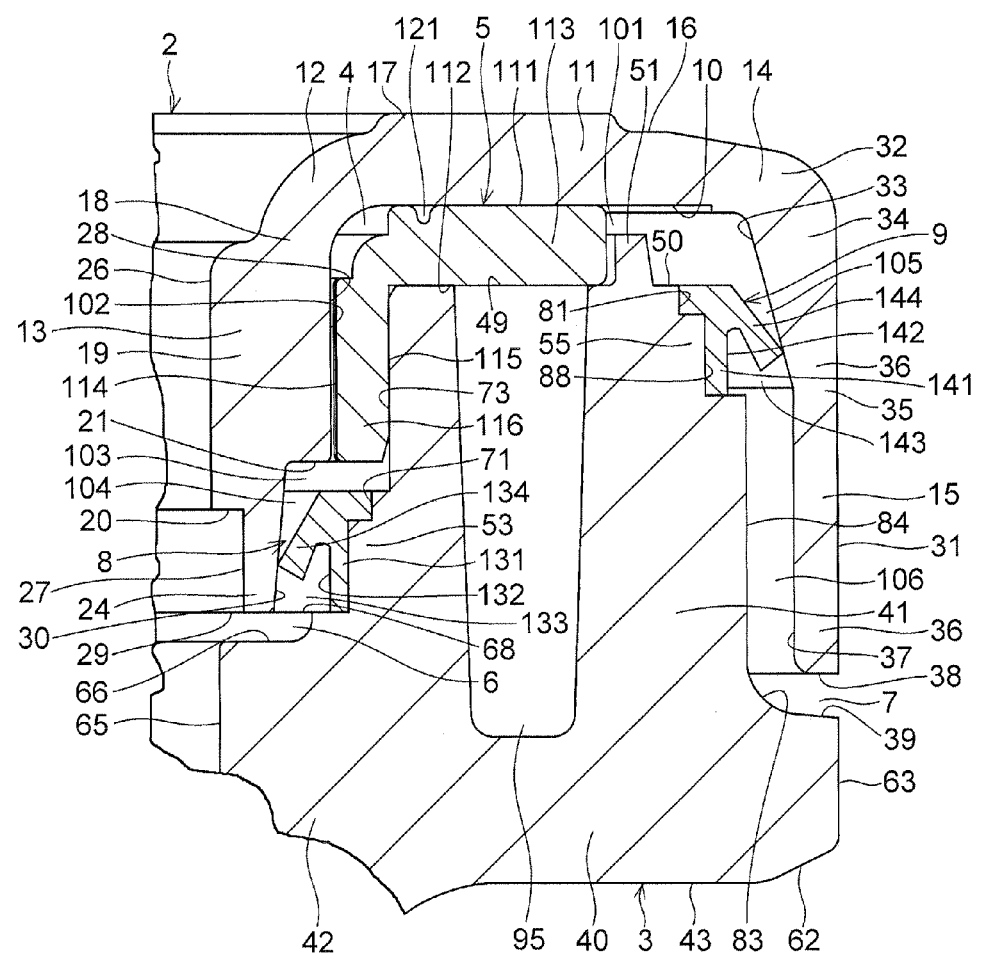
FIG. 4 is an explanatory partially enlarged cross-sectional view of the embodiment shown in FIG. 1.

Hereafter, a more detailed description will be given of the present invention with reference to the preferred embodiment illustrated in the drawings. It should be noted that the present invention is not limited to the embodiment.

In FIGS. 1 to 4, a thrust sliding bearing 1 in accordance with this embodiment for use in a strut-type suspension of a four-wheeled motor vehicle is comprised of a synthetic resin-made upper casing 2 which is fixed to a vehicle body side via a mounting member; a synthetic resin-made lower casing 3 which is superposed on the upper casing 2 so as to be rotatable about an axis O in a circumferential direction R relative to the upper casing 2 and on which a spring bearing surface for a suspension coil spring is formed; a synthetic resin-made sliding bearing piece 5 disposed in an annular space 4 between the upper casing 2 and the lower casing 3; and an annular inner seal member 8 and an annular outer seal member 9, both made of a synthetic resin, for respectively sealing an annular gap 6 on an inner peripheral side in a radial direction X and an annular gap 7 on an outer peripheral side in the radial direction X between the upper casing 2 and the lower casing 3, the annular gap 6 and the annular gap 7 allowing the annular space 4 to communicate with the outside.

Figure 5:
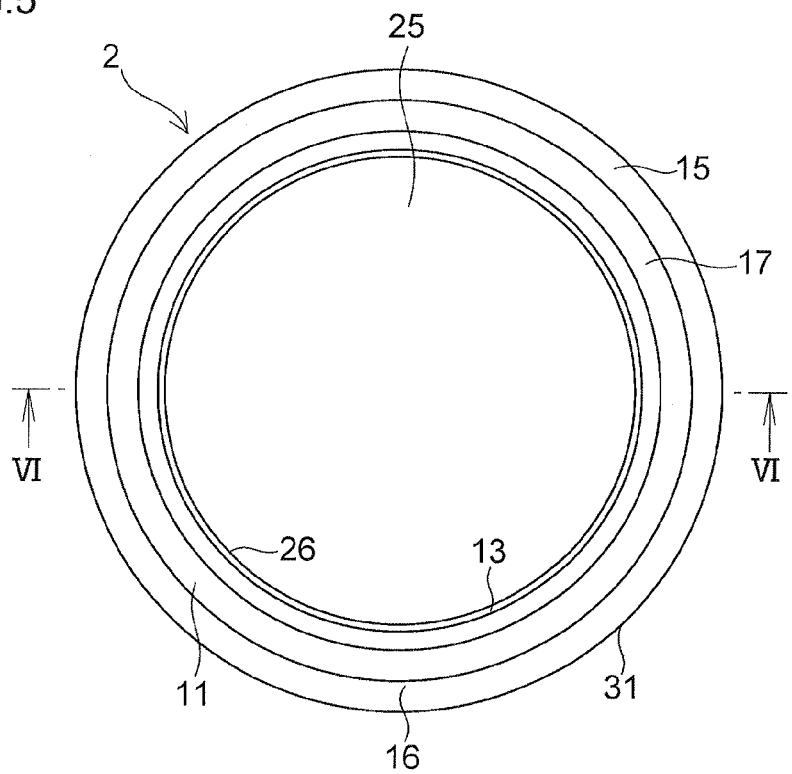
FIG. 5 is an explanatory plan view of an upper casing of the embodiment shown in FIG. 1.
Figure 6:
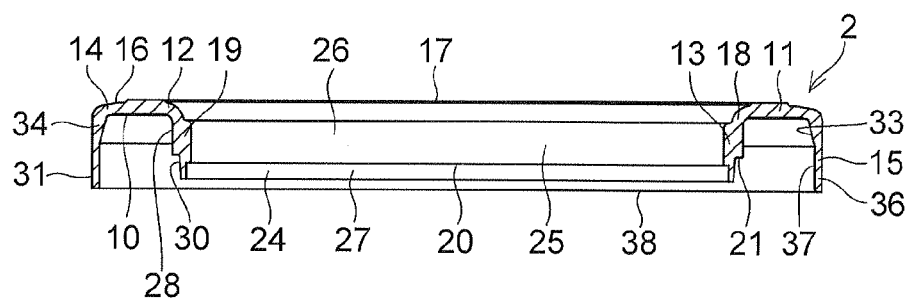
FIG. 6 is an explanatory cross-sectional view, taken in the direction of arrows along line VI-VI, of the upper casing shown in FIG. 5 in the embodiment shown in FIG. 1.
Figure 7:
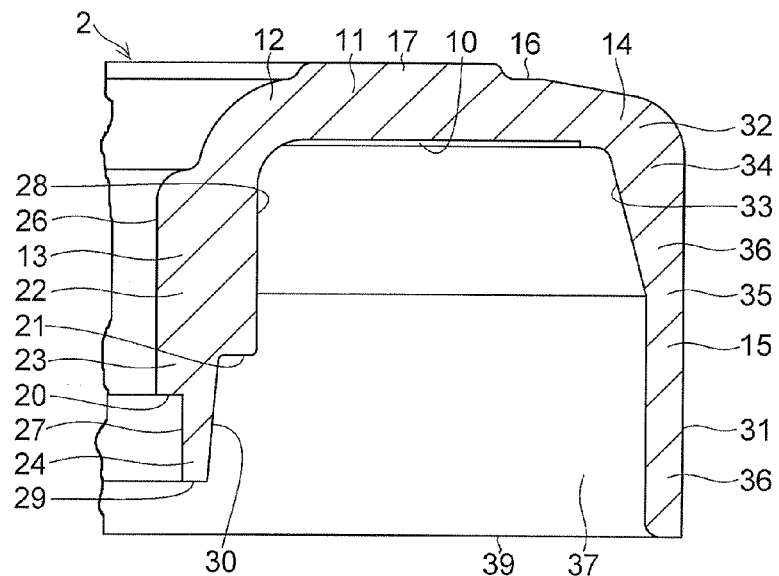
FIG. 7 is a partially enlarged cross-sectional view of the upper casing shown in FIG. 6 in the embodiment shown in FIG. 1.
Figure 8:
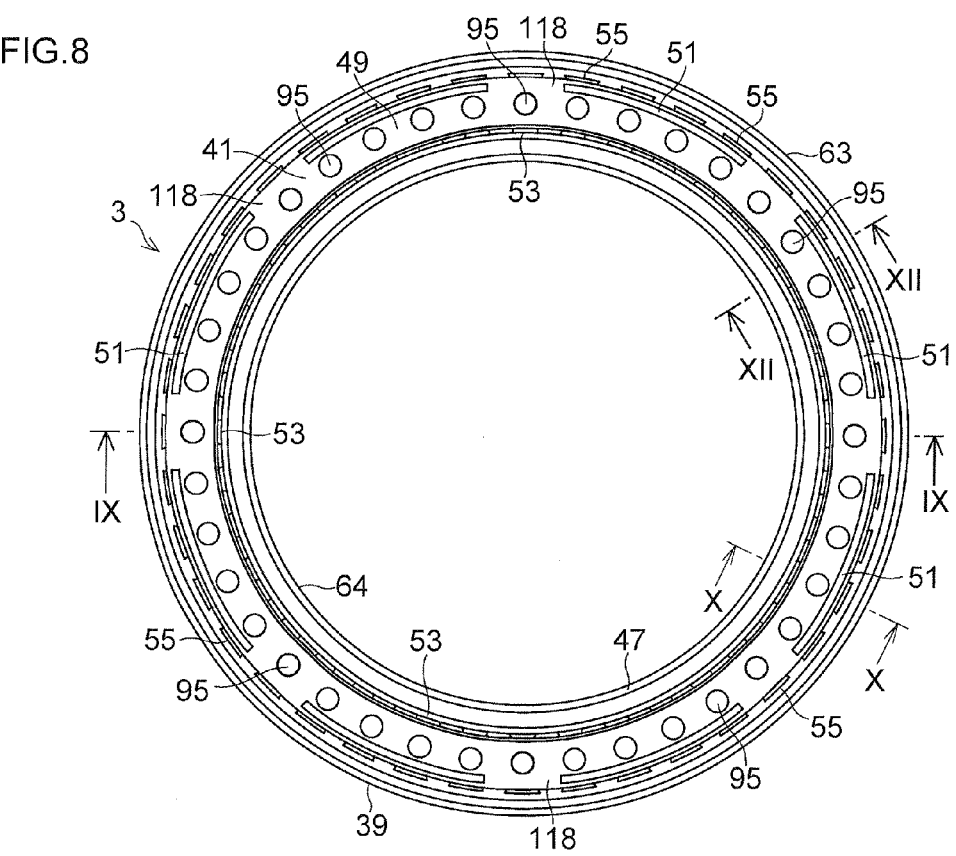
FIG. 8 is an explanatory plan view of a lower casing of the embodiment shown in FIG. 1.
Figure 9:
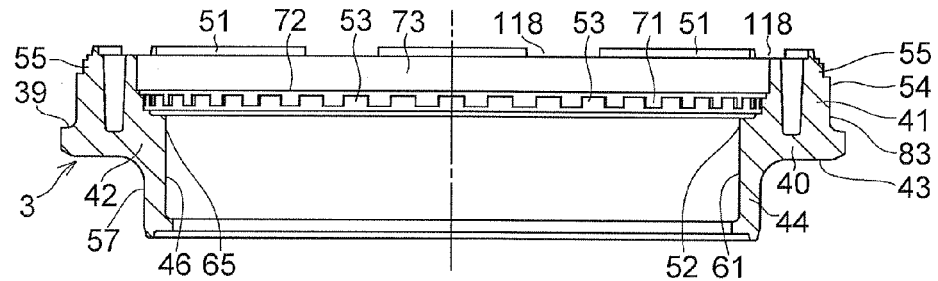
FIG. 9 is an explanatory cross-sectional view, taken in the direction of arrows along line IX-IX, of the lower casing shown in FIG. 8 in the embodiment shown in FIG. 1.
Figure 10:
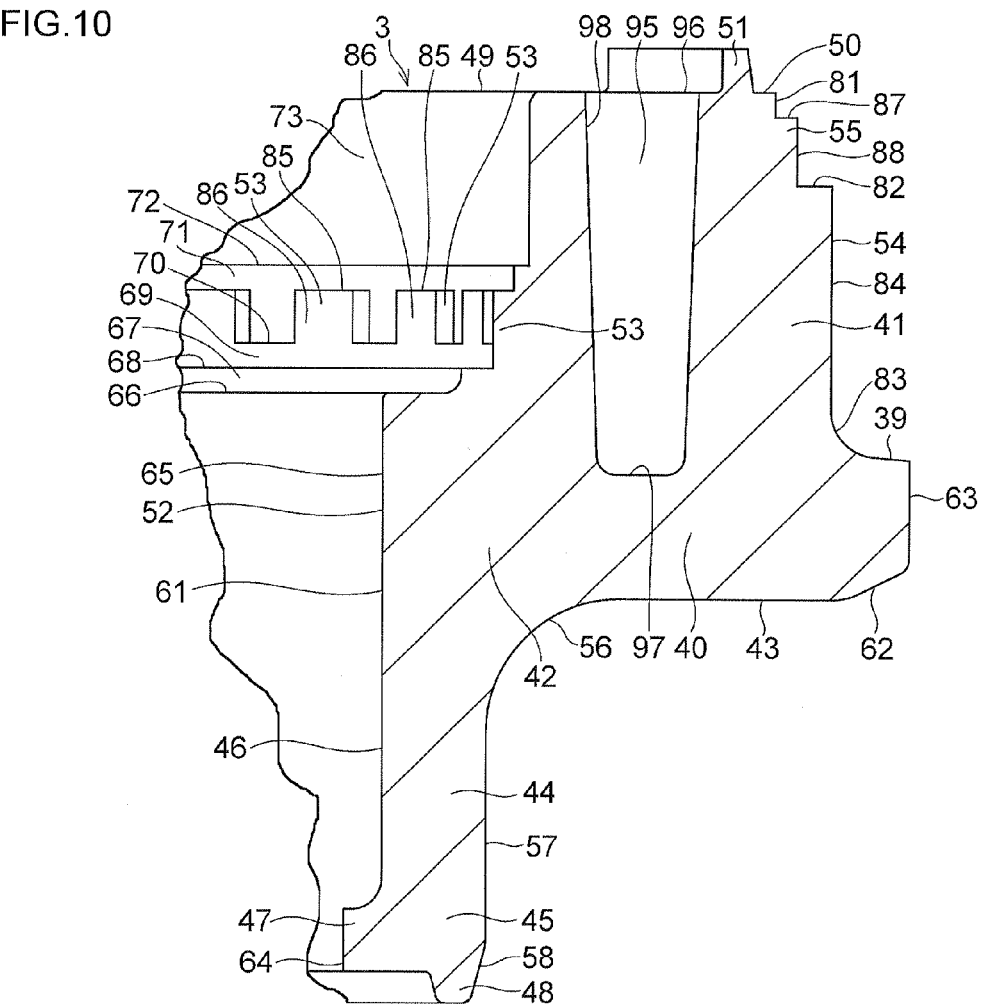
FIG. 10 is an explanatory cross-sectional view, taken in the direction of arrows along line X-X, of the lower casing shown in FIG. 8.
Figure 11:
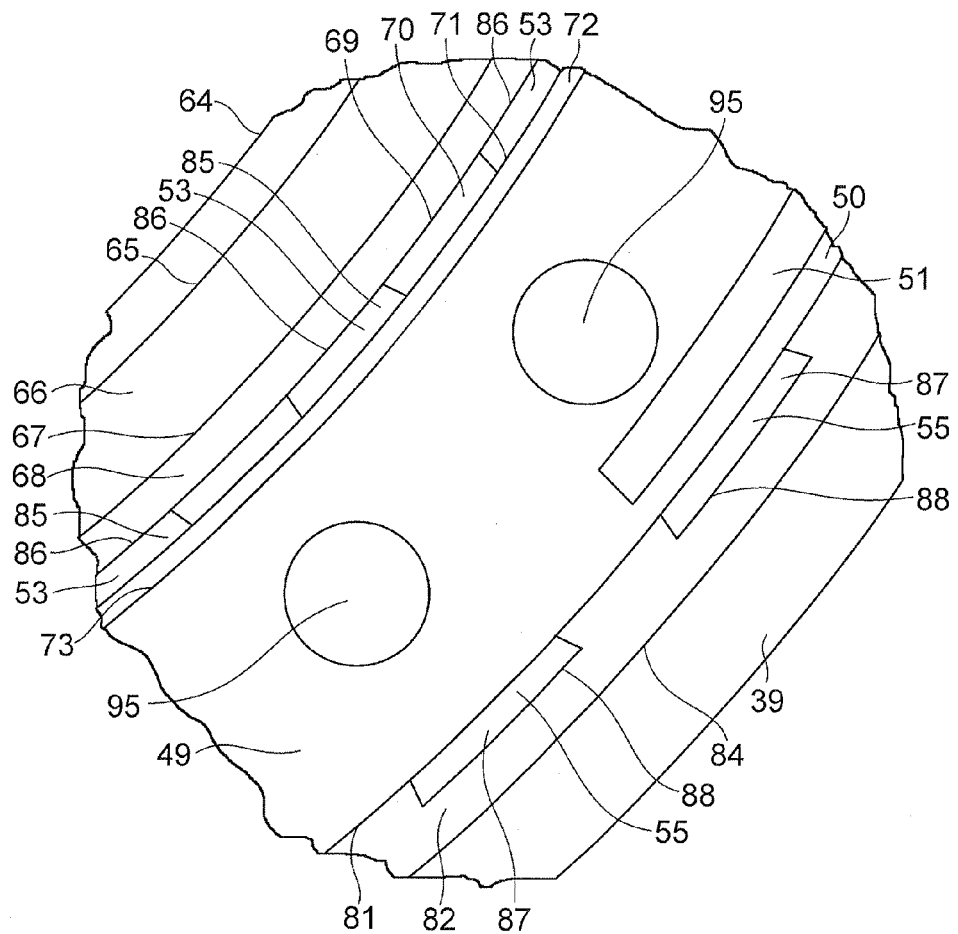
FIG. 11 is an explanatory partially enlarged plan view of the lower casing shown in FIG. 8.
Figure 12:
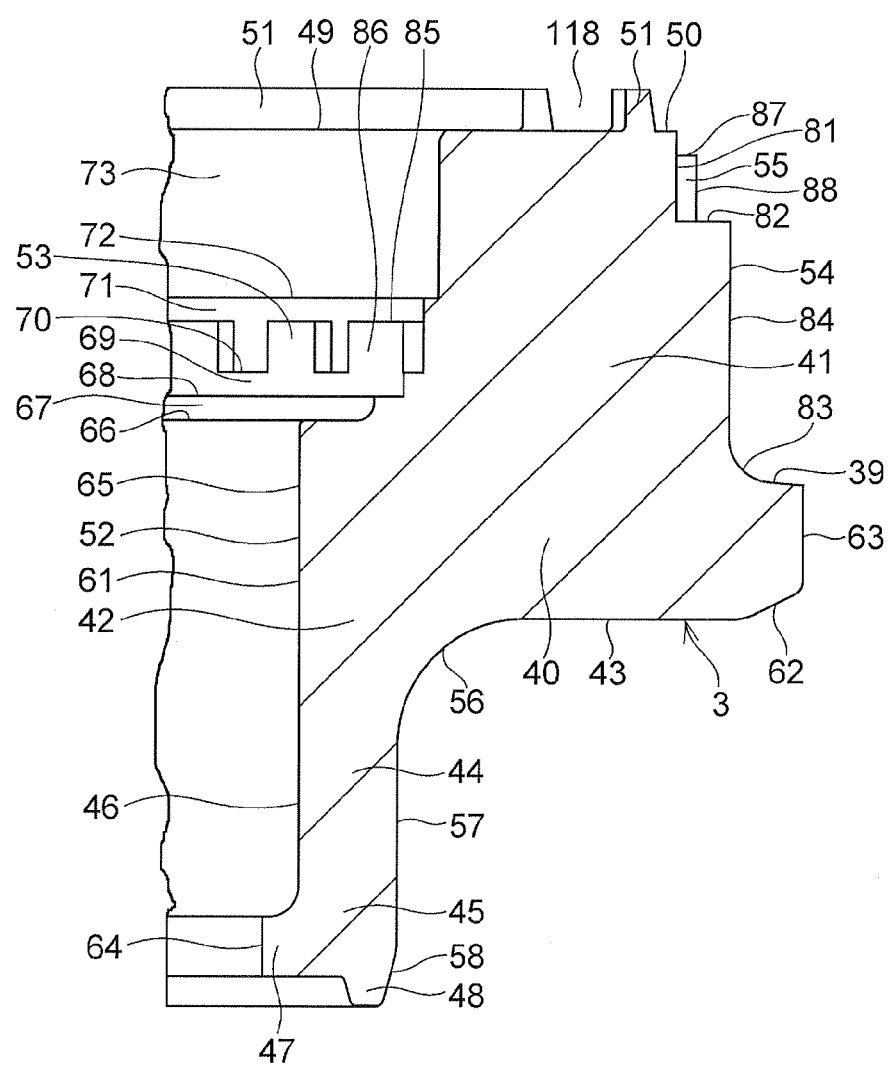
FIG. 12 is an explanatory cross-sectional view, taken in the direction of arrows XII-XII, of the lower casing shown in FIG. 8.
Figure 13:
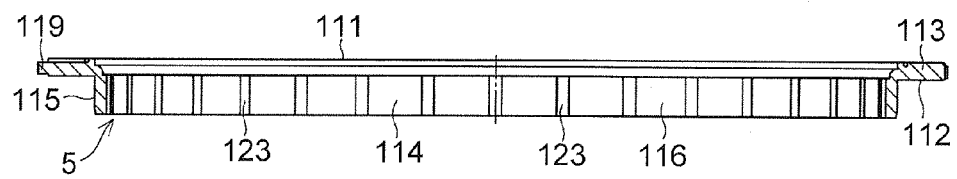
FIG. 13 is an explanatory cross-sectional view, taken in the direction of arrows XIII-XIII, of a sliding bearing piece shown in FIG. 14 in the embodiment shown in FIG. 1.
Figure 14:
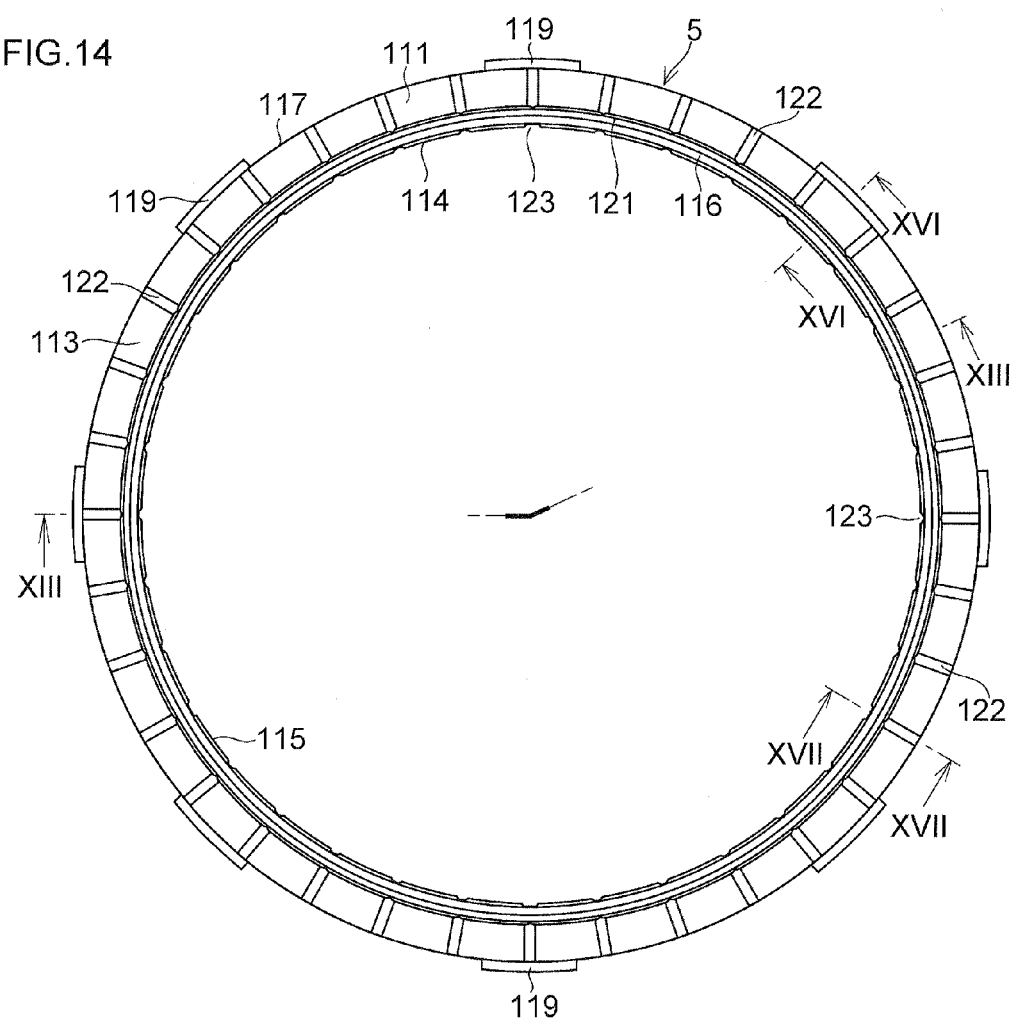
FIG. 14 is an explanatory plan view of the sliding bearing piece shown in FIG. 1.
Figure 15:
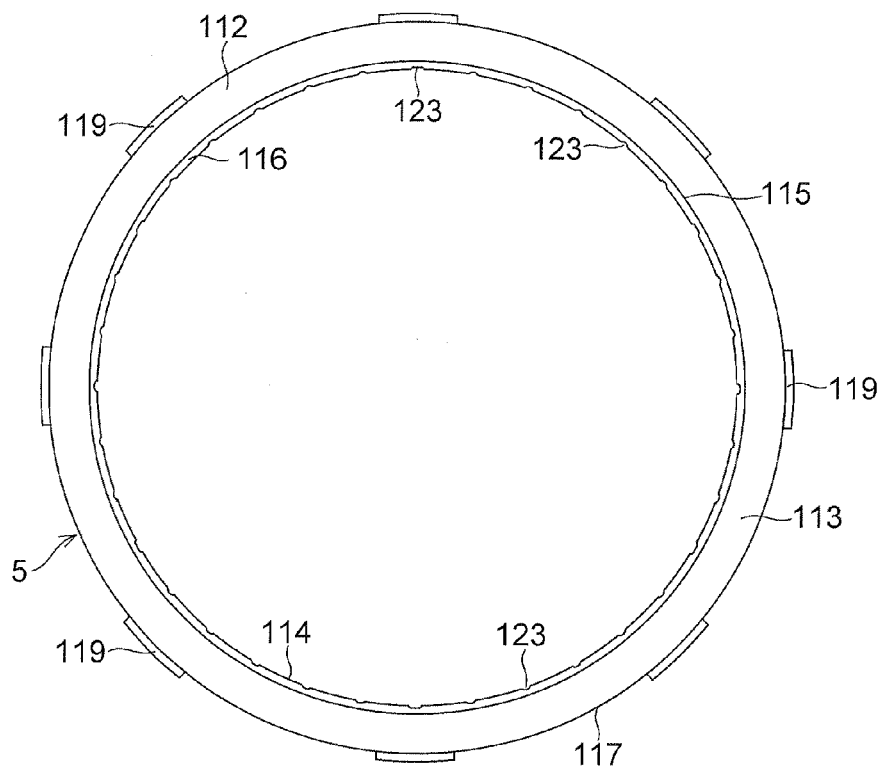
FIG. 15 is an explanatory bottom view of the sliding bearing piece shown in FIG. 1.
Figure 16:
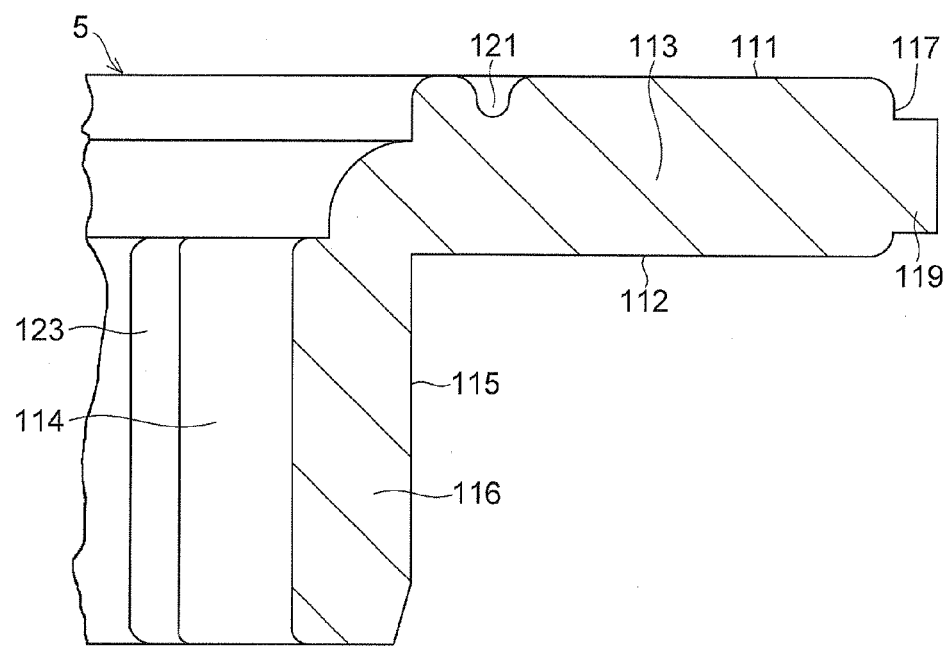
FIG. 16 is an explanatory cross-sectional view, taken in the direction of arrows along line XVI-XVI, of the sliding bearing piece shown in FIG. 14.
Figure 17:
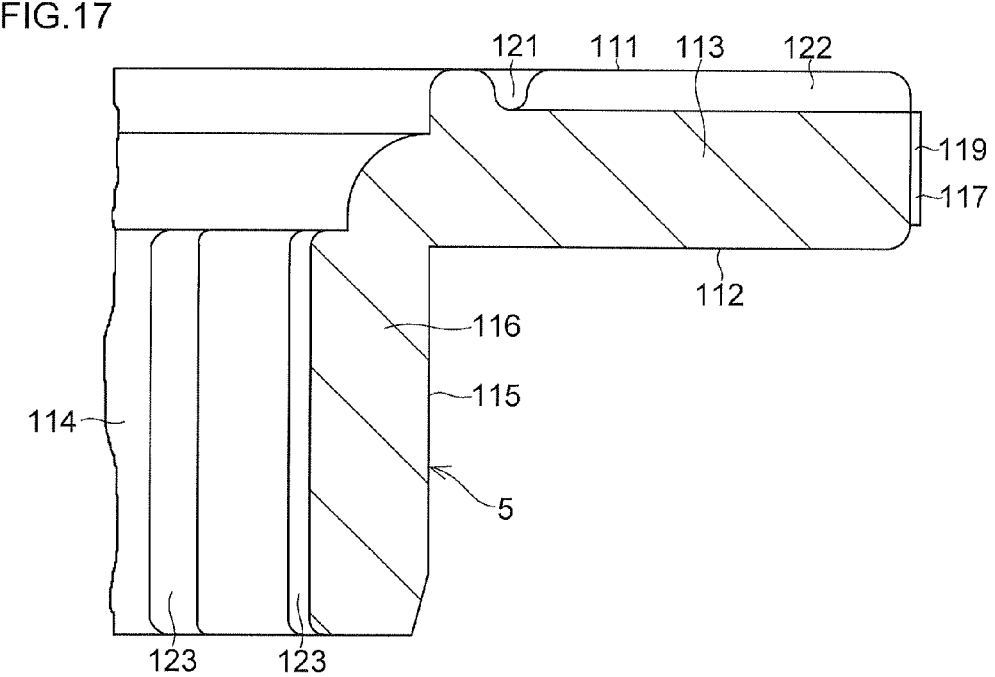
FIG. 17 is an explanatory cross-sectional view, taken in the direction of arrows along line XVII-XVII, of the sliding bearing piece shown in FIG. 14.
Figure 18:
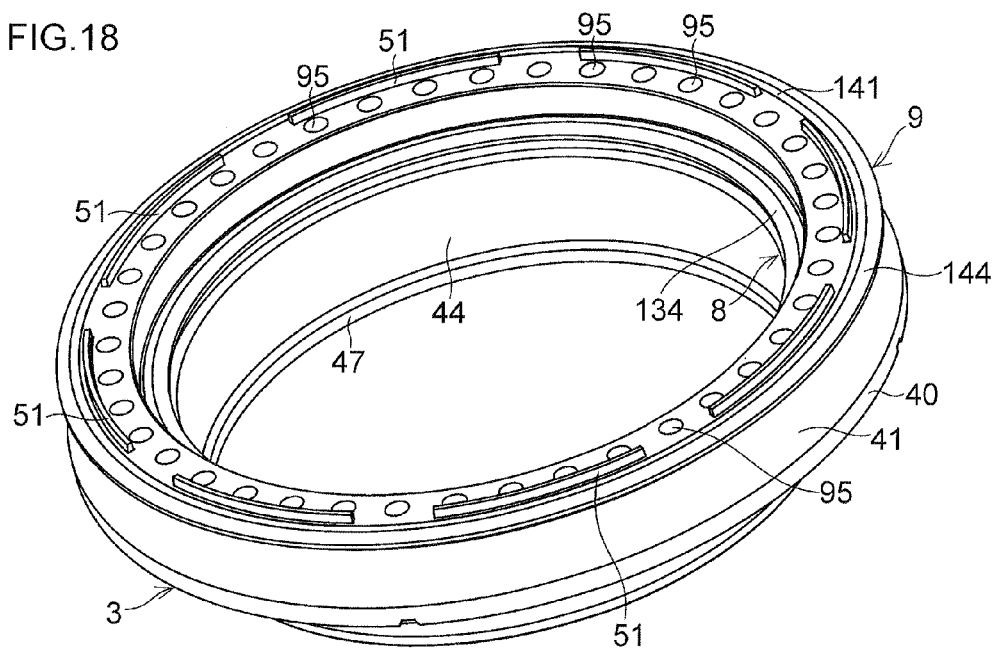
FIG. 18 is an explanatory perspective view of the lower casing having inner and outer seal members of the embodiment shown in FIG. 1.
Figure 19:
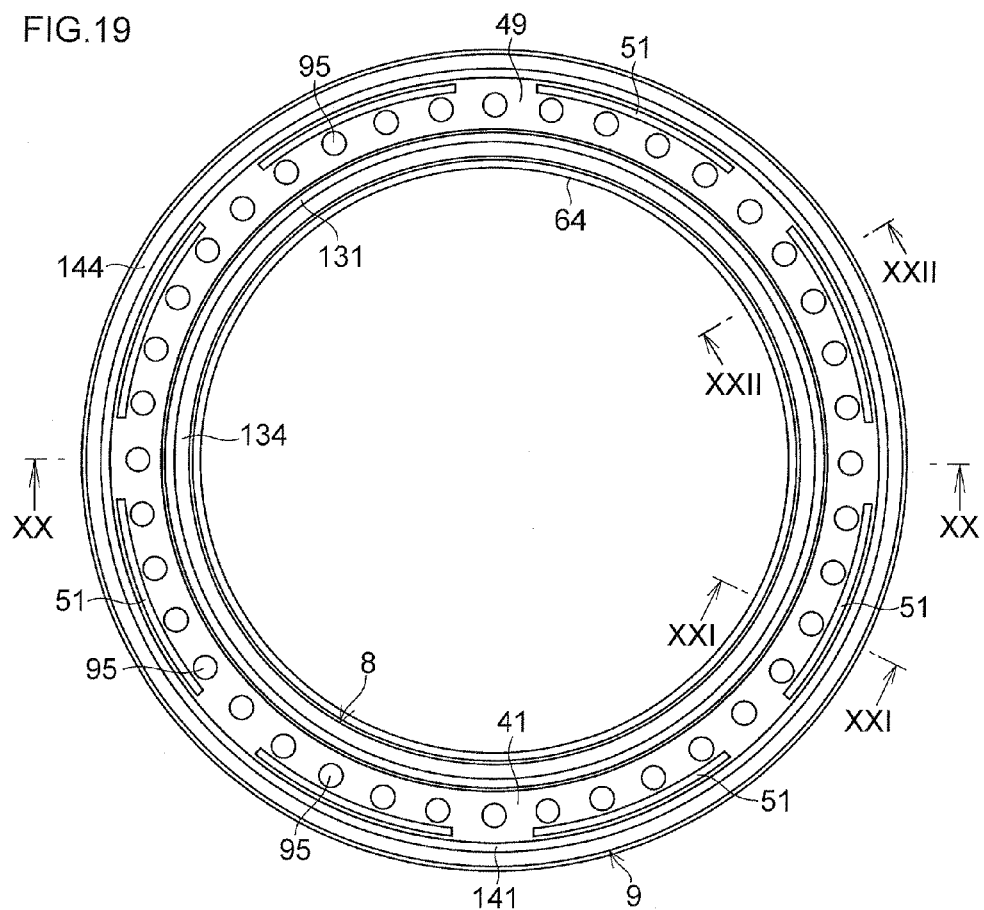
FIG. 19 is an explanatory plan view of the lower casing having the inner and outer seal members of the embodiment shown in FIG. 1.
Figure 20:
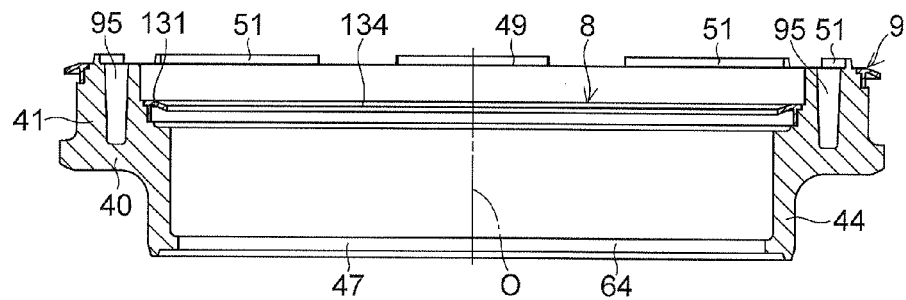
FIG. 20 is an explanatory cross-sectional view, taken in the direction of arrows along line XX-XX, of the lower casing having the inner and outer seal members shown in FIG. 19.
Figure 21:
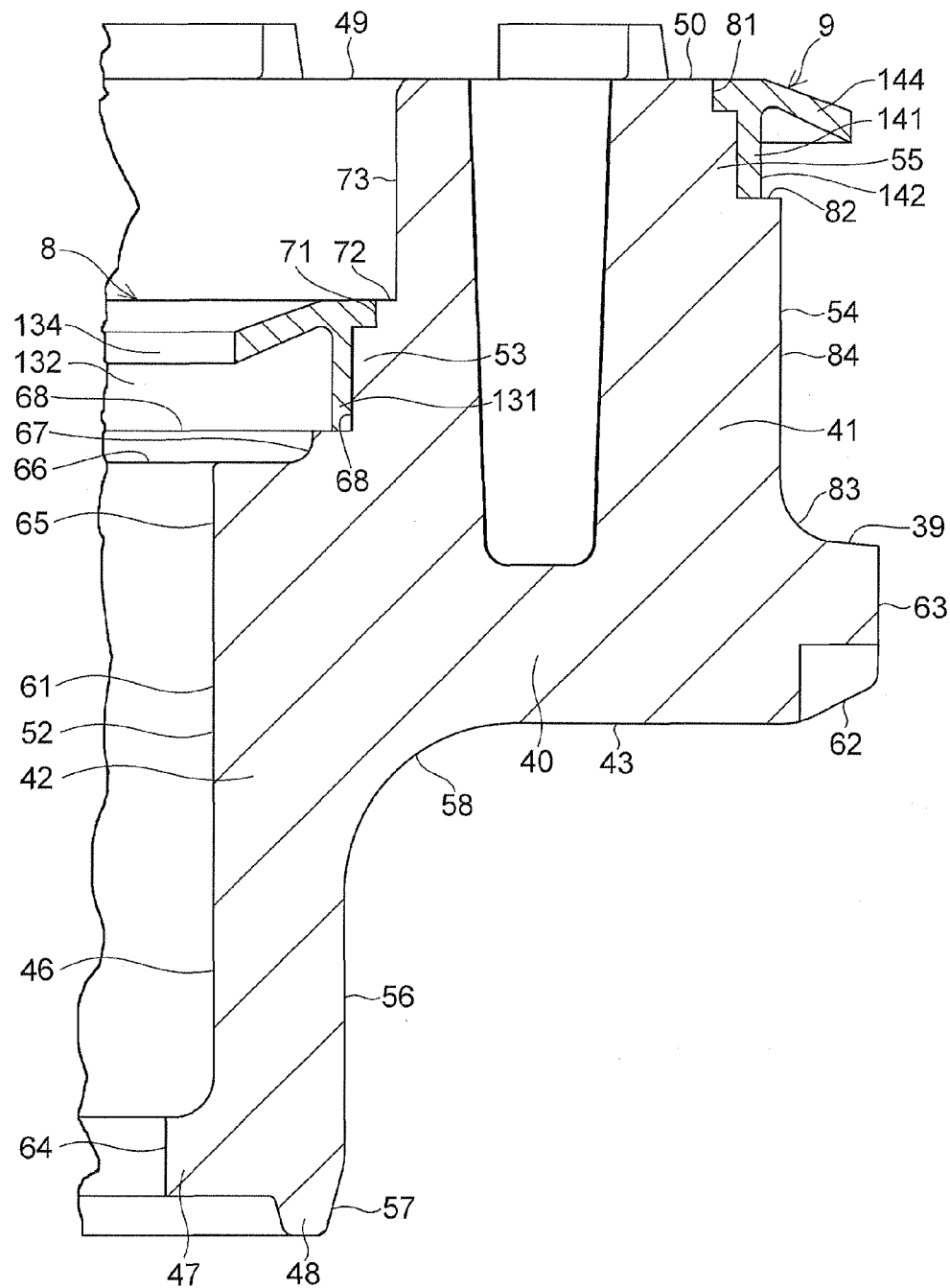
FIG. 21 is an explanatory cross-sectional view, taken in the direction of arrows along line XXI-XXI, of the lower casing having the inner and outer seal members shown in FIG. 19.
Figure 22:
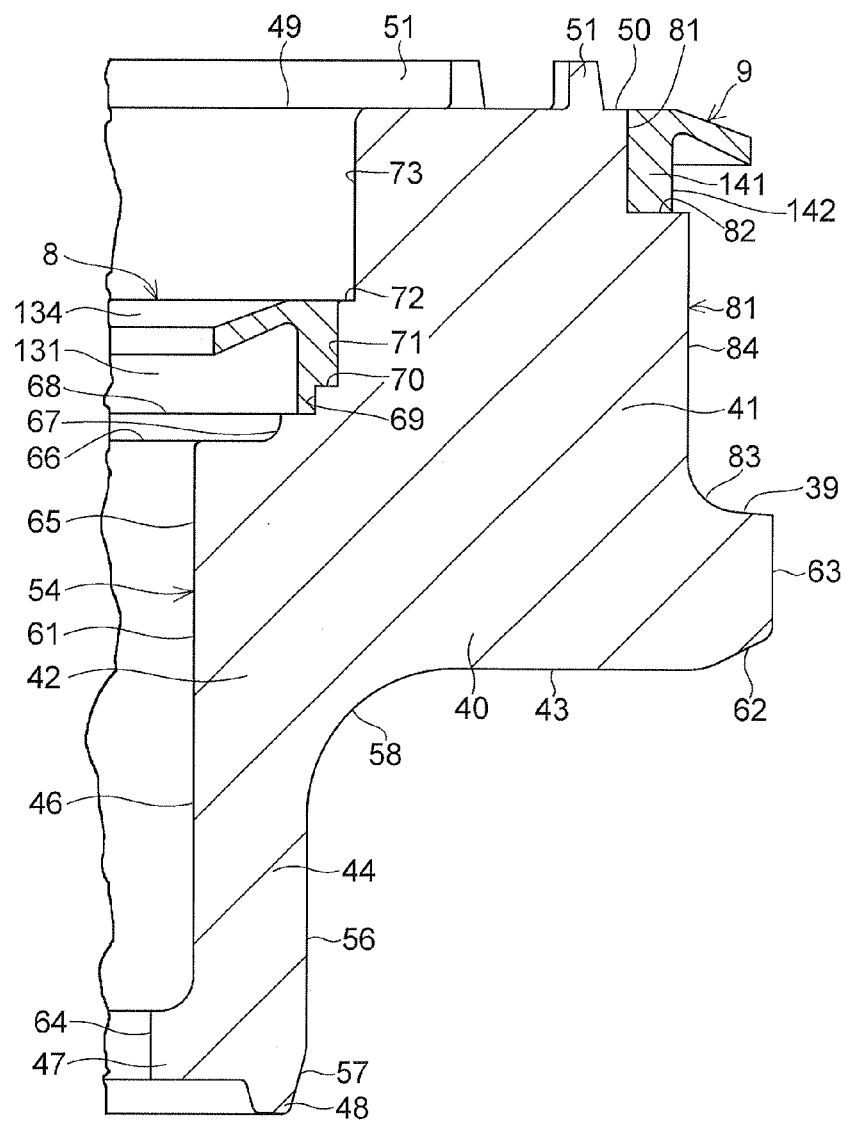
FIG. 22 is an explanatory cross-sectional view, taken in the direction of arrows along line XXII-XXII, of the lower casing having the inner and outer annular seal members shown in FIG. 19.
Figure 23:
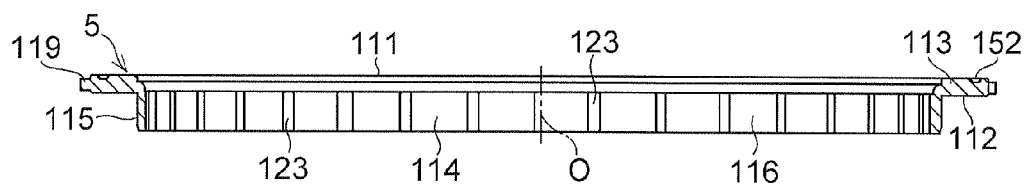
FIG. 23 is an explanatory cross-sectional view, taken in the direction of arrows along line XXIII-XXIII shown in FIG. 24, of another embodiment of the sliding bearing piece in the embodiment shown in FIG. 1.
Figure 24:
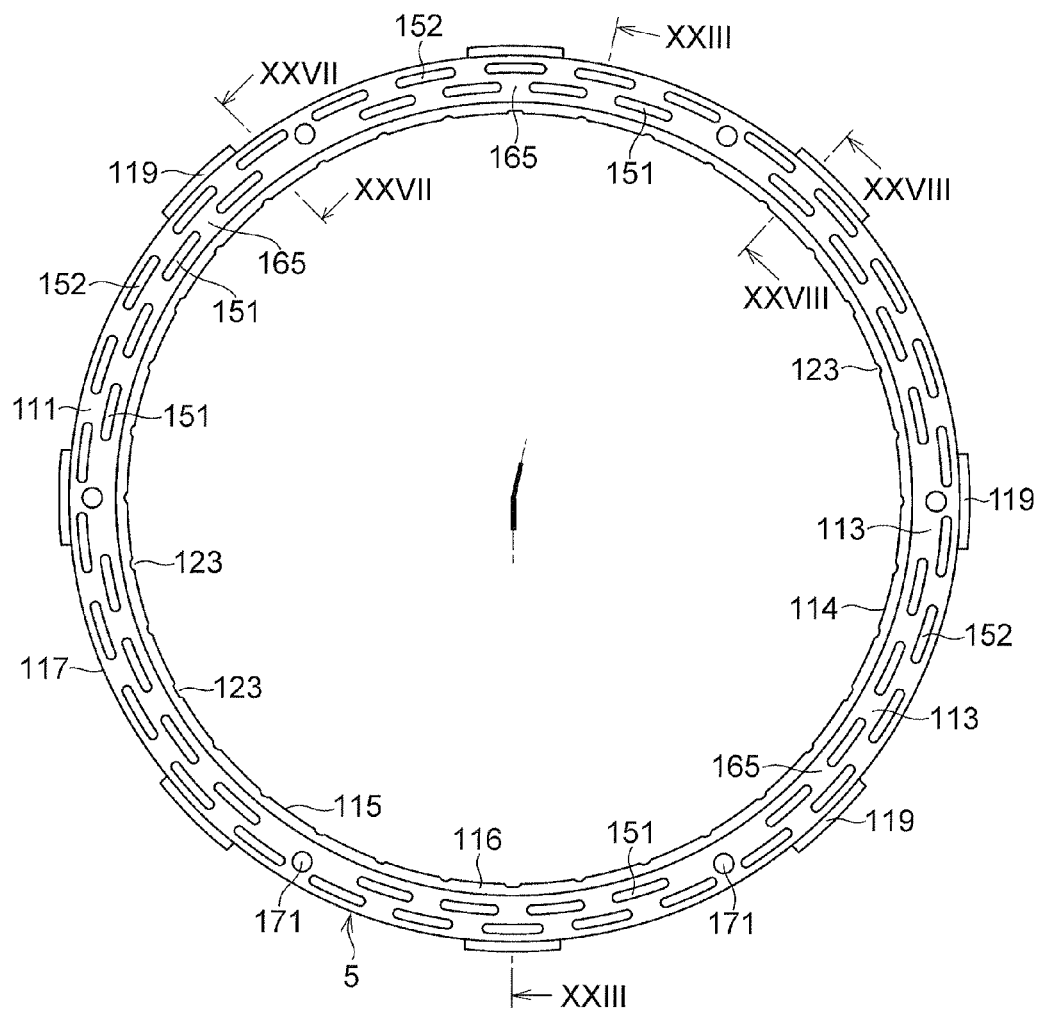
FIG. 24 is an explanatory plan view of the sliding bearing piece shown in FIG. 23.
Figure 25:
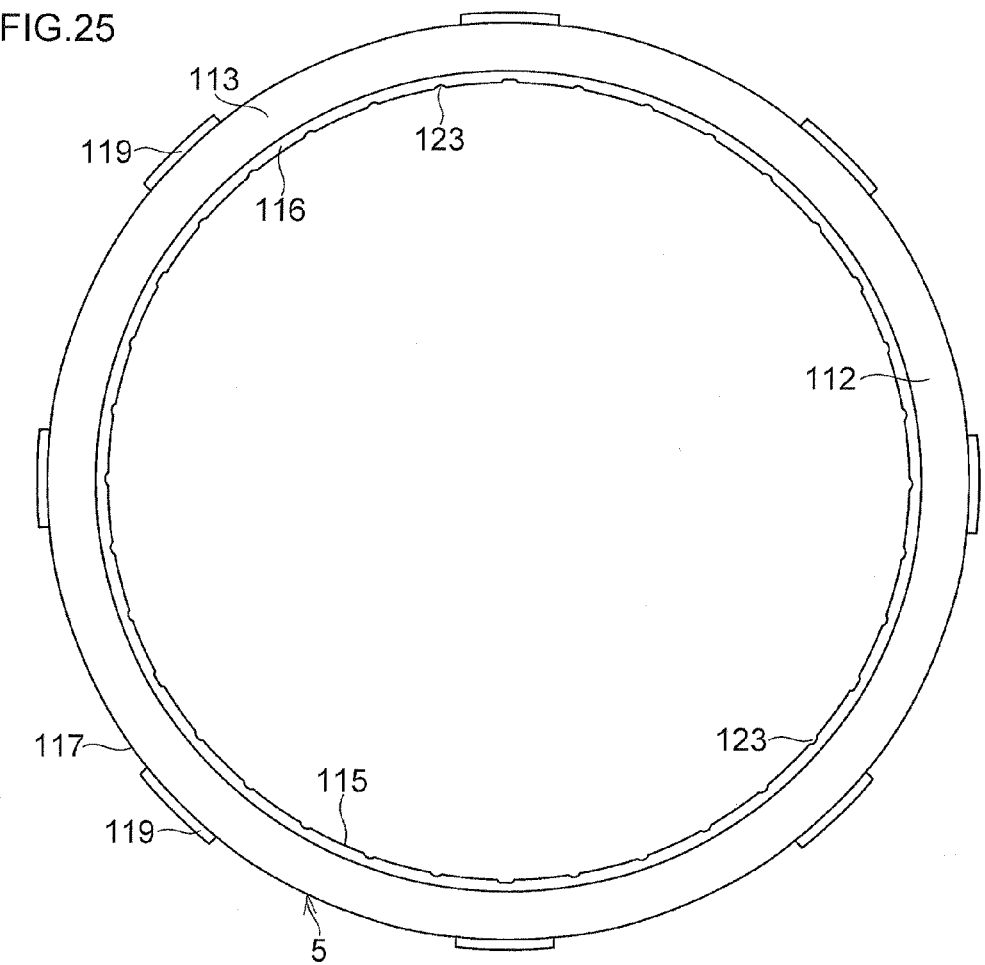
FIG. 25 is an explanatory bottom view of the sliding bearing piece shown in FIG. 23.
Figure 26:
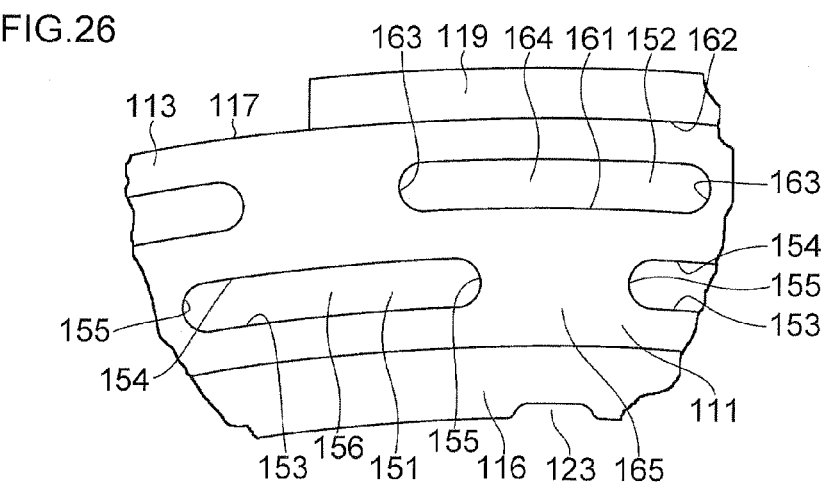
FIG. 26 is an explanatory partially enlarged plan view of the sliding bearing piece shown in FIG. 23.
Figure 27:
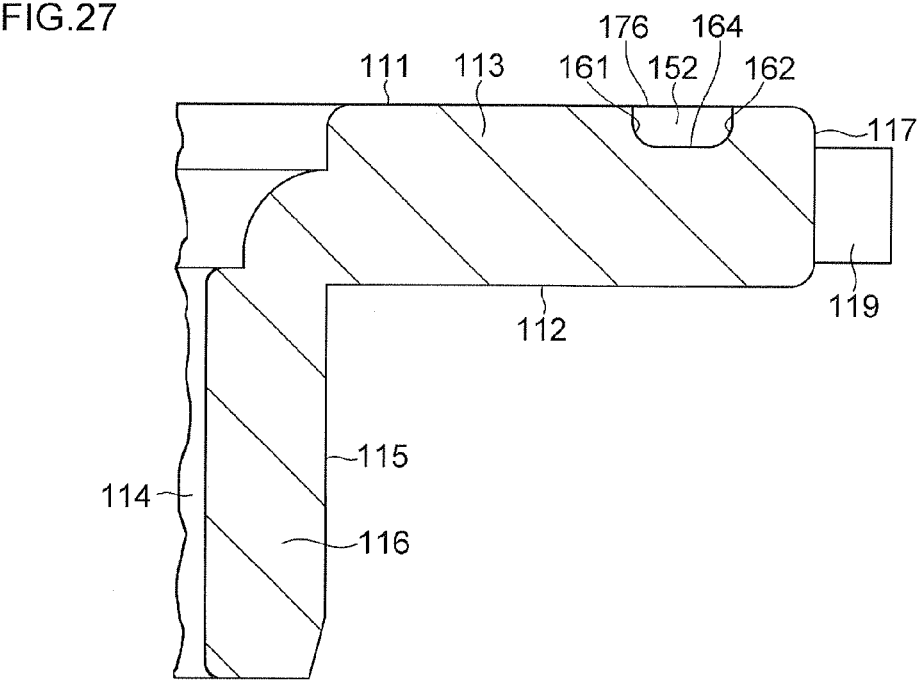
FIG. 27 is an explanatory cross-sectional view, taken in the direction of arrows along line XXVII-XXVII, of the sliding bearing piece shown in FIG. 24.
Figure 28:
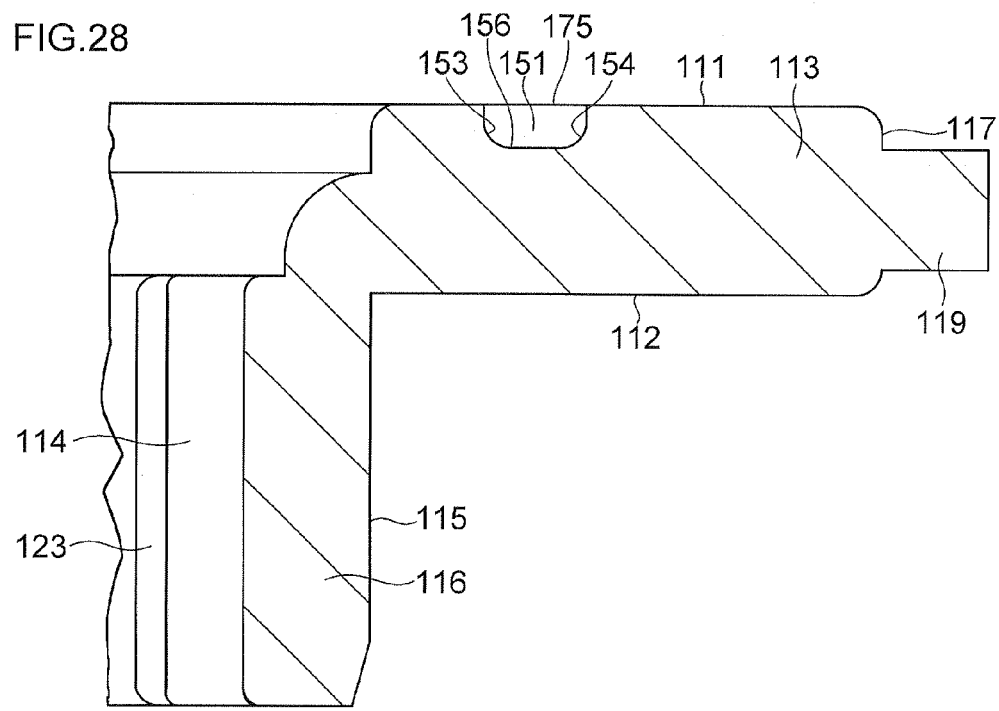
FIG. 28 is an explanatory cross-sectional view, taken in the direction of arrows along line XXVIII-XXVIII, of the sliding bearing piece shown in FIG. 24.

As shown in FIGS. 5 to 7, the upper casing 2 integrally includes an annular upper casing base portion 11 having an annular lower surface 10 in an axial direction Y, an inner cylindrical suspended portion 13 suspended from an inner peripheral end portion 12 in the radial direction X of the annular lower surface 10 of the upper casing base portion 11, an outer cylindrical suspended portion 15 suspended from an outer peripheral end portion 14 in the radial direction X of the annular lower surface 10 of the upper casing base portion 11, and an annular seat portion 17 formed protrudingly on a central portion in the radial direction X of an annular upper surface 16 of the upper casing base portion 11.

The inner cylindrical suspended portion 13 has a thick-walled cylindrical portion 19 connected at its upper end portion 18 to the inner peripheral end portion 12 of the annular lower surface 10 of the upper casing base portion 11, as well as a thin-walled cylindrical portion 24 which is connected at its upper end portion 23 to a lower end portion 22 of the thick-walled cylindrical portion 19 via an inner annular stepped surface 20 and an outer annular stepped surface 21 and is thinner-walled than the thick-walled cylindrical portion 19.

The thick-walled cylindrical portion 19 and the thin-walled cylindrical portion 24 respectively have cylindrical inner peripheral surfaces 26 and 27 which define a through hole 25 through which a shaft member of a strut-type suspension is inserted. The thick-walled cylindrical portion 19 has a cylindrical outer peripheral surface 28, and the thin-walled cylindrical portion 24 has a truncated conical outer peripheral surface 30 which is smaller in diameter than the outer peripheral surface 28 and is tapered from the outer annular stepped surface 21 toward an annular end face 29.

The outer cylindrical suspended portion 15 having a cylindrical outer peripheral surface 31 includes a cross-sectionally trapezoidal cylindrical portion 34 which is connected at its upper end portion 32 to the outer peripheral end portion 14 of the annular lower surface 10 of the upper casing base portion 11 and has an inner peripheral surface 33 which is gradually enlarged in diameter as viewed in a direction away from the annular lower surface 10 of the upper casing base portion 11, as well as a cylindrical portion 36 which is connected at its upper end portion 35 to a lower end portion of the cross-sectionally trapezoidal cylindrical portion 34. An annular end face 38 of the cylindrical portion 36 having a cylindrical inner peripheral surface 37 connected to the inner peripheral surface 33 is located lower in the axial direction Y than the annular end face 29 of the thin-walled cylindrical portion 24 of the inner cylindrical suspended portion 13.

As shown in FIGS. 8 to 12, the lower casing 3 integrally includes an annular lower casing base portion 40 which is superposed on the upper casing 2 so as to be rotatable about the axis O in the circumferential direction R relative to the upper casing 2, and which has an annular upper surface 39 in the axial direction Y; a cylindrical protrusion 41 protruding upwardly in the axial direction Y from the annular upper surface 39 of the lower casing base portion 40 toward the annular lower surface 10 of the upper casing base portion 11; a hollow cylindrical portion 44 protruding downwardly in the axial direction Y from an annular lower surface 43 at an inner peripheral portion 42 of the lower casing base portion 40; an annular protruding portion 47 protruding inwardly from a cylindrical inner surface 46 of the hollow cylindrical portion 44 at an end portion 45 of the hollow cylindrical portion 44; a hollow cylindrical protruding portion 48 protruding downwardly in the axial direction Y from the end portion 45 of the hollow cylindrical portion 44; a plurality of curved projecting portions 51 which project upwardly in the axial direction Y from an outer peripheral edge portion of an annular upper surface 49 of the cylindrical protrusion 41 by leaving an annular flat portion 50 and are provided uprightly along that outer peripheral edge portion in such a manner as to be spaced apart from each other in the circumferential direction R about the axis O; a plurality of inner inward protrusions 53 which are rectangular in a plan view, are integrally formed on a cylindrical inner surface 52 of the cylindrical protrusion 41 in such a manner as to be spaced apart from each other at equal intervals along the circumferential direction R, and protrude inwardly in the radial direction X; and a plurality of outer outward protrusions 55 which are rectangular in a plan view, are integrally formed on a cylindrical outer surface 54 of the cylindrical protrusion 41 in such a manner as to be spaced apart from each other at equal intervals along the circumferential direction R, and protrude outwardly in the radial direction X. The hollow cylindrical portion 44 has a cylindrical outer surface 57 connected to the annular lower surface 43 via an arcuately recessed surface 56, and the hollow cylindrical protruding portion 48 has a tapered outer surface 58 connected to the cylindrical outer surface 57.

The lower casing base portion 40 has, in addition to the annular upper surface 39, a cylindrical inner surface 61 connected to the cylindrical inner surface 46 and flush with the cylindrical inner surface 46, as well as a cylindrical outer surface 63 connected to the annular lower surface 43 via an annular tapered outer surface 62, and the protruding portion 47 has a cylindrical inner surface 64.

The cylindrical inner surface 52 of the cylindrical protrusion 41 includes a cylindrical inner surface 65 flush with and connected to the cylindrical inner surface 61; a cylindrical inner surface 67 adjacent to the cylindrical inner surface 65 via an annular stepped surface 66 and larger in diameter than the cylindrical inner surface 65; a cylindrical inner surface 69 adjacent to the cylindrical inner surface 67 via an annular stepped surface 68 and larger in diameter than the cylindrical inner surface 67; a cylindrical inner surface 71 adjacent to the cylindrical inner surface 69 via an annular stepped surface 70 and larger in diameter than the cylindrical inner surface 69, the inner inward protrusions 53 being integrally formed on the cylindrical inner surface 71; and a cylindrical inner surface 73 adjacent to the cylindrical inner surface 71 via an annular stepped surface 72 and connected to the annular upper surface 49, the cylindrical inner surface 73 being larger in diameter than the cylindrical inner surface 71.

The cylindrical outer surface 54 of the cylindrical protrusion 41 includes a cylindrical outer surface 81 which is connected to the annular flat portion 50 of the annular upper surface 49 and on which the outer outward protrusions 55 are integrally formed; an annular stepped surface 82 connected to the cylindrical outer surface 81; and a cylindrical outer surface 84 which is connected to the annular stepped surface 82 and extending downwardly in the axial direction Y beyond the annular stepped surface 66, the cylindrical outer surface 84 being larger in diameter than the cylindrical outer surface 81 and connected to the annular upper surface 39 via an arcuately recessed surface 83.

The plurality of inner inward protrusions 53, which are integrally formed on the cylindrical inner surface 71 of the cylindrical protrusion 41 along the circumferential direction R, are respectively formed integrally on the annular stepped surface 70 in such a manner as to extend upwardly in the axial direction Y from the annular stepped surface 70. An upper end face 85 of each inner inward protrusion 53 is located lower in the axial direction Y than the annular stepped surface 72, and an arcuately recessed inner surface 86 of each inner inward protrusion 53 is flush with the cylindrical inner surface 69.

The plurality of outer outward protrusions 55, which are integrally formed on the cylindrical outer surface 81 of the cylindrical protrusion 41 along the circumferential direction R, are respectively formed integrally on the annular stepped surface 82 in such a manner as to extend upwardly in the axial direction Y from the annular stepped surface 82. An upper surface 87 of each outer outward protrusion 55 is located lower in the axial direction Y than the annular flat portion 50, and an arcuately protruding outer surface 88 of each outer outward protrusion 55 is smaller in diameter than the cylindrical outer surface 84 and is located inwardly thereof in the radial direction Y.

A plurality of hole portions 95 are formed in the annular upper surface 49 of the cylindrical protrusion 41 along the circumferential direction R in such a manner as to extend downwardly in the axial direction Y. Each of the hole portions 95, which has a truncated conical shape, is tapered from its circular opening portion 96 to its bottom surface 97 defining the hole portion 95, and the hole portion 95 is defined by a truncated conical inner surface 98 and the circular bottom surface 97. These hole portions 95 are provided so as to reduce as practically as possible defects such as sink marks during molding by rendering uniform the thickness of the cylindrical protrusion 41 of the lower casing 3 and the thickness of other portions thereof.

The annular space 4 includes an annular space 101 between the annular lower surface 10 of the upper casing base portion 11 and the annular upper surface 49 of the cylindrical protrusion 41, an annular space 102 located between the outer peripheral surface 28 of the thick-walled cylindrical portion 19 in the inner cylindrical suspended portion 13 and the cylindrical inner surface 73 of the cylindrical protrusion 41 and communicating with the annular space 101, an annular space 103 located between the outer peripheral surface 30 of the thin-walled cylindrical portion 24 in the inner cylindrical suspended portion 13 and the cylindrical inner surface 73 of the cylindrical protrusion 41 and communicating with the annular space 102, an annular space 104 located between the outer peripheral surface 30 of the thin-walled cylindrical portion 24 in the inner cylindrical suspended portion 13 and the cylindrical inner surface 71 of the cylindrical protrusion 41 and communicating with the annular space 103, an annular space 105 located between the inner peripheral surface 33 of the cross-sectionally trapezoidal cylindrical portion 34 in the outer cylindrical suspended portion 15 and the cylindrical outer surface 81 of the cylindrical protrusion 41 and communicating with the annular space 101, and an annular space 106 located between the inner peripheral surface 37 of the cylindrical portion 36 in the outer cylindrical suspended portion 15 and the cylindrical outer surface 84 of the cylindrical protrusion 41 and communicating with the annular space 105, and as shown in FIGS. 13 to 17, the synthetic resin-made sliding bearing piece 5 disposed on the annular space 101 and the annular space 102 in the annular space 4 includes an annular thrust sliding bearing piece portion 113 having an annular upper surface 111 which is brought into slidable contact with the annular lower surface 10 of the upper casing base portion 11 and an annular lower surface 112 which is brought into contact with the annular upper surface 49 of the cylindrical protrusion 41; a cylindrical radial sliding bearing piece portion 116 which, at its one end portion, is integrally formed on one end portion of the thrust sliding bearing piece portion 113 in such a manner as to extend from that one end portion downwardly in the axial direction Y and has a cylindrical inner peripheral surface 114 which is brought into slidable contact with the outer peripheral surface 28 of the thick-walled cylindrical portion 19 of the inner cylindrical suspended portion 13 and a cylindrical outer peripheral surface 115 which is brought into contact with the cylindrical inner surface 73 of the cylindrical protrusion 41; and a plurality of radial projecting plate piece portions 119 which project outwardly in the radial direction X from an outer peripheral surface 117 of the thrust sliding bearing piece portion 113, and which are respectively arranged at discontinuous portions 118 between adjacent ones of the projecting portions 51 along the circumferential direction R and are clamped by the adjacent ones of the projecting portions 51 so that the sliding bearing piece 5 does not rotate in the circumferential direction R with respect to the lower casing 3.

In the synthetic resin-made sliding bearing piece 5, which is disposed in the annular space 101 between the annular lower surface 10 of the upper casing base portion 11 and the annular upper surface 49 of the cylindrical protrusion 41 and in the annular space 102 between the outer peripheral surface 28 of the inner cylindrical suspended portion 13 and the cylindrical inner surface 73 of the cylindrical protrusion 41, so as to be brought, at its annular upper surface 111 in the axial direction X and its cylindrical inner peripheral surface 114 in the radial direction, into slidable contact with the annular lower surface 10 of the upper casing base portion 11 and the radial outer peripheral surface 28 of the inner cylindrical suspended portion 13, and to be brought, at its annular lower surface 112 in the axial direction X and its cylindrical outer peripheral surface 115 in the radial direction Y, into contact with the annular upper surface 49 in the axial direction X and the cylindrical inner surface 73 in the radial direction Y, the thrust sliding bearing piece portion 113 has an annular groove 121 provided on an inner peripheral side of the annular upper surface 111 and a plurality of radial grooves 122 which are open at their one ends to the annular groove 121 and are open at their other ends to the outer peripheral surface 117, and which are provided on the upper surface 111 by being spaced apart at equal intervals in the circumferential direction R. The radial sliding bearing piece portion 116 has a plurality of axial grooves 123 which are open at their both ends and are provided on the cylindrical inner peripheral surface 114 by being spaced apart at equal intervals in the circumferential direction R. The annular groove 121, the radial grooves 122, and the axial grooves 123 serve as a sump section for lubricating oil such as grease.

The inner seal member 8 includes an annular inner seal base portion 131 which is joined to the cylindrical inner surfaces 69 and 71, the annular stepped surface 70, and outer surfaces of the inner inward protrusions 53 of the cylindrical protrusion 41 in such a manner as to cover the outer surfaces of the inner inward protrusions 53 of the cylindrical protrusion 41, as well as a flexible annular inner seal portion 134 which is connected to an upper end portion of an inner peripheral surface 132 of the inner seal base portion 131 and is elastically brought into flexural contact with the truncated conical outer peripheral surface 30 of the thin-walled cylindrical portion 24 in the inner cylindrical suspended portion 13, so as to seal a gap 133 between the outer peripheral surface 30 of the thin-walled cylindrical portion 24 in the inner cylindrical suspended portion 13 and the inner peripheral surface 132 of the inner seal base portion 131. As the inner seal portion 134 is elastically brought into flexural contact with the truncated conical outer peripheral surface 30 of the thin-walled cylindrical portion 24, the inner seal member 8 seals the annular gap 6 which is located between the annular end face 29 of the thin-walled cylindrical portion 24, i.e., an axial end portion of the inner cylindrical suspended portion 13, and the annular stepped surface 66 of the cylindrical protrusion 41, and which allows the annular space 104 of the annular space 4 to communicate with the outside.

The inner seal portion 134 has a smaller thickness than the thickness of the inner seal base portion 131 and extends diagonally downwardly from an upper end portion of the inner peripheral surface 132 of the inner seal base portion 131.

The outer seal member 9 includes an annular outer seal base portion 141 which is joined to the cylindrical outer surface 81, the annular stepped surface 82, and outer surfaces of the outer outward protrusions 55 of the cylindrical protrusion 41 in such a manner as to cover the outer surfaces of the outer outward protrusions 55 of the cylindrical protrusion 41, as well as an outer seal portion 144 which is connected to an upper end portion of an outer peripheral surface 142 of the outer seal base portion 141 and is elastically brought into flexural contact with the truncated conical inner peripheral surface 33 of the cross-sectionally trapezoidal cylindrical portion 34 in the outer cylindrical suspended portion 15, so as to seal a gap 143 between the inner peripheral surface 33 of the cross-sectionally trapezoidal cylindrical portion 34 in the outer cylindrical suspended portion 15 and the outer peripheral surface 142 of the outer seal base portion 141. As the outer seal portion 144 is elastically brought into flexural contact with the inner peripheral surface 33 of the cross-sectionally trapezoidal cylindrical portion 34 in the outer cylindrical suspended portion 15, the outer annular seal member 9 seals the annular gap 7 which is located between the annular end face 38 of the cylindrical portion 36, i.e., an axial end portion of the outer cylindrical suspended portion 15, and the annular upper surface 39 of the lower casing base portion 40, and which allows the annular space 106 of the annular space 4 to communicate with the outside.

The outer seal portion 144 has a smaller thickness than the thickness of the outer seal base portion 141 and extends diagonally downwardly from an upper end portion of the outer peripheral surface 142 of the outer seal base portion 141.

The outer seal base portion 141 may be adapted to cover the annular flat portion 50.

The inner seal member 8 consisting of the inner seal base portion 131 and the inner seal portion 134, both annular in shape, is formed by being integrally joined to the cylindrical inner surface 71 of the cylindrical protrusion 41 by insert molding on the cylindrical inner surface 71 of the cylindrical protrusion 41, while the outer seal member 9 consisting of the outer seal base portion 141 and the outer seal portion 144, both annular in shape, is formed by being integrally joined to the cylindrical outer surface 81 of the cylindrical protrusion 41 by insert molding on the cylindrical outer surface 81 of the cylindrical protrusion 41.

The above-described sliding bearing 1 is adapted to allow the relative rotation in the circumferential direction R of the lower casing 3 with respect to the upper casing 2 by the relative sliding in the circumferential direction R of each of the upper surface 111 of the thrust sliding bearing piece portion 113 with respect to the annular lower surface 10 of the upper casing base portion 11 and the inner peripheral surface 114 of the radial sliding bearing piece portion 116 with respect to the outer peripheral surface 28 of the thick-walled cylindrical portion 19.

According to the above-described sliding bearing 1, since the inner seal member 8 and the outer seal member 9 are respectively formed by being integrally joined to the cylindrical inner surface 71 of the cylindrical protrusion 41 of the lower casing 3 and to the cylindrical outer surface 81 of the cylindrical protrusion 41 of the lower casing 3 by insert molding, the number of parts can be reduced, and the assembling efficiency excels, making it possible to attain a reduction in the manufacturing cost. Moreover, the durability can be improved by eliminating the possibility of coming off.

In addition, according to the sliding bearing 1, the sealability can be improved since there are provided the inner seal member 8 for sealing the annular gap 6 between the annular end face 29 of the inner cylindrical suspended portion 13 of the upper casing 2 and the annular stepped surface 66 of the cylindrical protrusion 41 of the lower casing 3 and the outer seal member 9 for sealing the annular gap 7 between the annular end face 38 of the outer cylindrical suspended portion 15 of the upper casing 2 and the annular upper surface 39 of the lower casing base portion 40 of the lower casing 3. Hence, it is possible to prevent the ingress of foreign objects such as dust and the like onto the sliding surfaces in the annular space 4 through these annular gaps 6 and 7.

Meanwhile, as shown in FIGS. 23 to 28, in the synthetic resin-made sliding bearing piece 5 including: the annular thrust sliding bearing piece portion 113 having the annular upper surface 111 which is brought into slidable contact with the annular lower surface 10 of the upper casing base portion 11 and the annular lower surface 112 which is brought into contact with the annular upper surface 49 of the cylindrical protrusion 41; the cylindrical radial sliding bearing piece portion 116 which, at its one end portion, is integrally formed on the one end portion of the thrust sliding bearing piece portion 113 in such a manner as to extend downwardly in the axial direction Y and has the cylindrical inner peripheral surface 114 which is brought into slidable contact with the outer peripheral surface 28 of the thick-walled cylindrical portion 19 of the inner cylindrical suspended portion 13 of the upper casing 2 and the cylindrical outer peripheral surface 115 which is brought into contact with the cylindrical inner surface 73 of the cylindrical protrusion 41; and the plurality of radial projecting plate piece portions 119 which project outwardly in the radial direction X from the outer peripheral surface 117 of the thrust sliding bearing piece portion 113, and which are respectively arranged at the discontinuous portions 118, each located between adjacent ones of the curved projecting portions 51 provided uprightly on the outer peripheral edge portion of the annular upper surface 49 of the cylindrical protrusion 41 along the circumferential direction R, and are clamped by the adjacent ones of the projecting portions 51 so that the sliding bearing piece 5 does not rotate in the circumferential direction R with respect to the lower casing 3, the thrust sliding bearing piece portion 113 may have pluralities of inner recessed portions 151 and outer recessed portions 152 which are formed on the annular upper surface 111 along the circumferential direction R and in at least two rows including an inner row and an outer row in the radial direction, and which are arranged with phase differences with respect to each other in the circumferential direction R.

Each of the inner recessed portions 151 formed as the inner row is defined by an inner circular arc-shaped surface 153 extending in a circular arc shape about the axis O as the center; an outer circular arc-shaped surface 154 extending in a circular arc shape about the axis O as the center outwardly of the inner circular arc-shaped surface 153 in the radial direction Y; a pair of semicircular surfaces 155 respectively connected to opposite ends of the inner circular arc-shaped surface 153 and the outer circular arc-shaped surface 154 and opposed to each other in the circumferential direction R; and a bottom surface 156 connected to the respective ones of the inner circular arc-shaped surface 153, the outer circular arc-shaped surface 154, and the pair of semicircular surfaces 155.

Each of the outer recessed portions 152 formed as the outer row is defined by an inner circular arc-shaped surface 161 extending in a circular arc shape about the axis O as the center; an outer circular arc-shaped surface 162 extending in a circular arc shape about the axis O as the center outwardly of the inner circular arc-shaped surface 161 in the radial direction Y; a pair of semicircular surfaces 163 respectively connected to both the inner circular arc-shaped surface 161 and the outer circular arc-shaped surface 162 and opposed to each other in the circumferential direction R; and a bottom surface 164 connected to the respective ones of the inner circular arc-shaped surface 161, the outer circular arc-shaped surface 162, and the pair of semicircular surfaces 163. Each outer recessed portion 152 is arranged at a position corresponding to a discontinuous portion 165 in the circumferential direction R between adjacent ones of the inner recessed portions 151.

Small circular portions 171 which are arranged at intervals of 60° along the circumferential direction R indicate positions of projecting pins projecting from a mold at the time of the molding of the sliding bearing piece 5, and are not arranged in the inner recessed portions 151.

The pluralities of inner recessed portions 151 and outer recessed portions 152 are formed such that the ratio of the total area of opening surfaces 175 and 176 of the pluralities of inner recessed portions 151 and outer recessed portions 152 in surfaces which combine the opening surfaces 175 and 176 of pluralities of inner recessed portions 151 and outer recessed portions 152 and the annular upper surface 111 of the thrust sliding bearing piece portion 113 is 20 to 50%, preferably 30 to 40%.

The radial sliding bearing piece portion 116 shown in FIGS. 23 to 28 may also have the plurality of axial grooves 123 which are open at their both ends in the axial direction Y and are provided on the cylindrical inner peripheral surface 114 by being spaced apart at equal intervals in the circumferential direction R.

The pluralities of inner recessed portions 151 and outer recessed portions 152, which are arranged in the annular upper surface 111 of the thrust sliding bearing piece portion 113 along the circumferential direction R and in at least two rows including the inner row and the outer row in the radial direction X, as well as the axial grooves 123 formed in the inner peripheral surface 114 of the radial sliding bearing piece portion 116, serve as a sump section for lubricating oil such as grease.

In the thrust sliding bearing piece portion 113 of the sliding bearing 1 thus formed, by virtue of the inner recessed portions 151 and the outer recessed portions 152 formed in the annular upper surface 111, the area of contact between the annular upper surface 111, which is the thrust sliding bearing surface and serves as the sliding surface, and the mating member, i.e., the annular lower surface 10 of the upper casing 2 is reduced in the relative sliding in the circumferential direction R about the axis O between the annular upper surface 111 of the thrust sliding bearing piece portion 113 and the annular lower surface 10 of the upper casing 2 to increase the surface pressure (load per unit area) acting on the annular upper surface 111, thereby making it possible to attain further lower friction through a combination of the lower friction due to the friction between the synthetic resins and the lower friction due to the presence on the sliding surfaces of the lubricating oil which is filled in the inner recessed portions 151 and the outer recessed portions 152.

Figure 29:
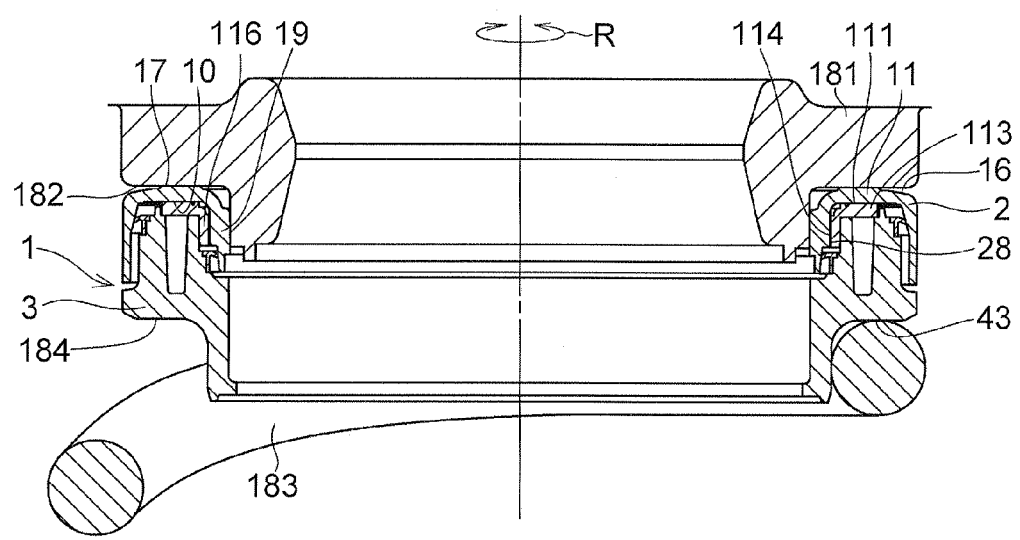
FIG. 29 is an explanatory cross-sectional view in which the sliding bearing shown in FIG. 1 is incorporated in a strut-type suspension.

As shown in FIG. 29, for example, the synthetic resin-made sliding bearing 1 in accordance with this embodiment may be applied to a strut-type suspension in a four-wheeled motor vehicle by disposing the synthetic resin-made sliding bearing 1 in accordance with this embodiment between a vehicle body-side bearing surface 182 of a vehicle body-side mounting member 181 and a suspension coil spring 183 such that the seat portion 17 of the annular upper surface 16 of the upper casing 2 is abutted against the vehicle body-side bearing surface 182 of the vehicle body-side mounting member 181, and such that the annular lower surface 43 of the lower casing 3 as a spring bearing surface 184 is abutted against an upper end portion of the suspension coil spring 183.

In the strut-type suspension shown in FIG. 29, the relative rotation in the circumferential direction R of the suspension coil spring 183 with respect to the vehicle body-side mounting member 181 is allowed by the relative sliding in the circumferential direction R of each of the upper surface 111 of the thrust sliding bearing piece portion 113 with respect to the annular lower surface 10 of the upper casing base portion 11 of the sliding bearing 1 and the inner peripheral surface 114 of the radial sliding bearing piece portion 116 with respect to the outer peripheral surface 28 of the thick-walled cylindrical portion 19.

DESCRIPTION OF REFERENCE NUMERALS

1: sliding bearing
2: upper casing
3: lower casing
4: annular space
5: sliding bearing piece
6, 7: gap
8: inner annular seal member
9: outer annular seal member

The invention claimed is:
1. A synthetic resin-made thrust sliding bearing comprising: a synthetic resin-made upper casing integrally including an annular upper casing base portion having an annular lower surface in an axial direction, an inner cylindrical suspended portion suspended from a radially inner peripheral end portion of the annular lower surface of the upper casing base portion, and an outer cylindrical suspended portion suspended from a radially outer peripheral end portion of the annular lower surface of the upper casing base portion;
a synthetic resin-made lower casing integrally including an annular lower casing base portion having an annular upper surface in the axial direction and superposed on said upper casing so as to be rotatable about an axis relative to said upper casing, a cylindrical protrusion protruding from the annular upper surface of the lower casing base portion toward the annular lower surface of the upper casing base portion, a plurality of inner inward protrusions which are integrally formed on a cylindrical inner surface of the cylindrical protrusion along a circumferential direction and protrude radially inwardly, and a plurality of outer outward protrusions which are integrally formed on a cylindrical outer surface of the cylindrical protrusion along the circumferential direction and protrude radially outwardly;
a synthetic resin-made sliding bearing piece disposed in an annular space between the annular lower surface of the upper casing base portion and the annular upper surface of the cylindrical protrusion and in an annular space between an outer peripheral surface of the inner cylindrical suspended portion and the cylindrical inner surface of the cylindrical protrusion, so as to be brought at an axial annular upper surface and a radial cylindrical inner peripheral surface thereof into slidable contact with the annular lower surface of the upper casing base portion and a radial outer peripheral surface of the inner cylindrical suspended portion, while being brought at an axial annular lower surface and a radial cylindrical outer peripheral surface thereof into contact with an axial annular upper surface and a radial cylindrical inner surface of the cylindrical protrusion;

an inner seal member including an annular inner seal base portion which is connected to the cylindrical inner surface of the cylindrical protrusion such that the annular inner seal base portion covers the plurality of inner inward protrusions of the cylindrical protrusion and a flexible inner seal portion which is connected to an inner peripheral surface of the inner seal base portion and is elastically brought into flexural contact with the outer peripheral surface of the inner cylindrical suspended portion of said upper casing, so as to seal a gap between the outer peripheral surface of the inner cylindrical suspended portion of said upper casing and the inner peripheral surface of the inner seal base portion; and
an outer seal member including an annular outer seal base portion which is connected to the cylindrical outer surface of the cylindrical protrusion such that the annular outer seal base portion covers the plurality of outer outward protrusions of the cylindrical protrusion and a flexible outer seal portion which is connected to an outer peripheral surface of the outer seal base portion and is elastically brought into flexural contact with an inner peripheral surface of the outer cylindrical suspended portion of said upper casing, so as to seal a gap between the inner peripheral surface of the outer cylindrical suspended portion of said upper casing and the outer peripheral surface of the outer seal base portion.
2. The synthetic resin-made sliding bearing according to claim 1, wherein the inner seal portion has a smaller thickness than the thickness of the inner seal base portion and extends diagonally downwardly from the inner peripheral surface of the inner seal base portion.
3. The synthetic resin-made sliding bearing according to claim 1, wherein the outer seal portion has a smaller thickness than the thickness of the outer seal base portion and extends diagonally downwardly from the outer peripheral surface of the outer seal base portion.
4. The synthetic resin-made sliding bearing according to claim 1, wherein said lower casing further includes a plurality of curved projecting portions which are provided uprightly on an outer peripheral edge portion of the annular upper surface of the cylindrical protrusion of said lower casing along the outer peripheral edge portion, and
said sliding bearing piece includes an annular thrust sliding bearing piece portion having an annular upper surface which is brought into slidable contact with the annular lower surface of the upper casing base portion and an annular lower surface which is brought into contact with the annular upper surface of the cylindrical protrusion, a cylindrical radial sliding bearing piece portion which, at its one end portion, is integrally formed on one end portion of the thrust sliding bearing piece portion such that the cylindrical radial sliding bearing piece portion, at its one end portion, extends from the one end portion of the thrust sliding bearing piece portion downwardly in the axial direction and has a cylindrical inner peripheral surface which is brought into slidable contact with the outer peripheral surface of the inner cylindrical suspended portion and a cylindrical outer peripheral surface which is brought into contact with the cylindrical inner surface of the cylindrical protrusion, and a plurality of radial projecting plate piece portions which project radially outwardly from an outer peripheral surface of the thrust sliding bearing piece portion, and which are respectively disposed between adjacent ones of the curved projecting portions of said lower casing so that said sliding bearing piece does not rotate in the circumferential direction with respect to said lower casing.

5. The synthetic resin-made sliding bearing according to claim 4, wherein the thrust sliding bearing piece portion has an annular groove formed on an inner peripheral side of its annular upper surface and a plurality of radial grooves which are open at their one ends to the annular groove and are open at their other ends to the outer peripheral surface, and which are formed on the upper surface by being spaced apart at equal intervals in the circumferential direction, and the radial sliding bearing piece portion has a plurality of axial grooves which are open at their both ends and are provided on the cylindrical inner peripheral surface by being spaced apart at equal intervals in the circumferential direction.

6. The synthetic resin-made sliding bearing according to claim 4, wherein the thrust sliding bearing piece portion has pluralities of inner recessed portions and outer recessed portions which are formed in its annular upper surface along the circumferential direction and in at least two rows including an inner row and an outer row in the radial direction, and which are arranged with phase differences with respect to each other in the circumferential direction, and the radial sliding bearing piece portion has a plurality of axial grooves which are open at their both ends and are formed on the cylindrical inner peripheral surface by being spaced apart at equal intervals in the circumferential direction.

7. The synthetic resin-made sliding bearing according to claim 6, wherein each of the plurality of inner recessed portions is defined by an inner circular arc-shaped surface extending in a circular arc shape about the axis as a center; an outer circular arc-shaped surface extending in a circular arc shape about the axis as the center radially outwardly of the inner circular arc-shaped surface; a pair of semicircular surfaces respectively connected to the inner circular arc-shaped surface and the outer circular arc-shaped surface and opposed to each other in the circumferential direction; and a bottom surface connected to respective ones of the inner circular arc-shaped surface, the outer circular arc-shaped surface, and the pair of semicircular surfaces.

8. The synthetic resin-made sliding bearing according to claim 6, wherein each of the plurality of outer recessed portions is defined by an inner circular arc-shaped surface extending in a circular arc shape about the axis as a center; an outer circular arc-shaped surface extending in a circular arc shape about the axis as the center radially outwardly of the inner circular arc-shaped surface; a pair of semicircular surfaces respectively connected to the inner circular arc-shaped surface and the outer circular arc-shaped surface and opposed to each other in the circumferential direction; and a bottom surface connected to respective ones of the inner circular arc-shaped surface, the outer circular arc-shaped surface, and the pair of semicircular surfaces.

9. The synthetic resin-made sliding bearing according to claim 6, wherein a ratio of a total area of opening surfaces of the pluralities of inner recessed portions and outer recessed portions in surfaces which combine the opening surfaces of the pluralities of inner recessed portions and outer recessed portions and the annular upper surface of the thrust sliding bearing piece portion is 20 to 50%.

* * * * *